United States Patent
Nakajima et al.

(10) Patent No.: US 7,085,437 B2
(45) Date of Patent: Aug. 1, 2006

(54) DOCUMENT MODIFICATION APPARATUS AND IMAGE PROCESSING APPARATUS

(75) Inventors: Masato Nakajima, Ibaraki-ken (JP); Yukimoto Sakata, Ibaraki-ken (JP); Junichi Hakamada, Ibaraki-ken (JP); Asako Nakatsugawa, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 445 days.

(21) Appl. No.: 09/764,392

(22) Filed: Jan. 19, 2001

(65) Prior Publication Data

US 2001/0021279 A1   Sep. 13, 2001

(30) Foreign Application Priority Data

Jan. 20, 2000   (JP)   ............................ P2000-012034

(51) Int. Cl.
*G06K 9/03*   (2006.01)
*G06K 9/00*   (2006.01)

(52) U.S. Cl. ...................................... 382/311; 382/181

(58) Field of Classification Search ................ 382/185, 382/186, 187, 190, 195, 203, 206, 299, 310, 382/311, 181; 715/508; 345/619, 634
See application file for complete search history.

(56) References Cited

U.S. PATENT DOCUMENTS

| | | | | |
|---|---|---|---|---|
| 4,785,296 A | * | 11/1988 | Tabata et al. | 345/634 |
| 5,231,579 A | * | 7/1993 | Tsuchiya et al. | 715/508 |
| 5,257,328 A | * | 10/1993 | Shimizu | 382/311 |
| 5,717,794 A | * | 2/1998 | Koga et al. | 382/309 |
| 6,043,823 A | * | 3/2000 | Kodaira et al. | 345/619 |
| 6,466,694 B1 | * | 10/2002 | Kamada et al. | 382/181 |
| 6,512,848 B1 | * | 1/2003 | Wang et al. | 382/176 |

FOREIGN PATENT DOCUMENTS

| | | |
|---|---|---|
| EP | 0 587 450 | 3/1994 |
| EP | 0 736 999 | 10/1996 |
| EP | 0 929 183 | 7/1999 |
| JP | 04157876 | 5/1992 |
| JP | 04-160982 | 6/1992 |
| JP | 07-287767 | 10/1995 |
| JP | 08-265558 | 10/1996 |
| JP | 10-215369 | 8/1998 |

* cited by examiner

*Primary Examiner*—Samir Ahmed
(74) *Attorney, Agent, or Firm*—Nath & Associates PLLC; Gregory B. Kang; Teresa M. Arroyo

(57) ABSTRACT

Automatic region extracting means (2) extracts rectangle regions having attributes of "character", "photograph", "table", "ruled line", "frame" from input image data through Image input means (1) and stores the information of the extracted rectangle regions into Modification information storage means (3). Display means (4) displays the input image including the extracted rectangle regions according to the information of the extracted rectangle regions. The operator selects desired extracted rectangle regions in the input image on a display screen and specifies the kind of the modification for the selected rectangle regions by using Operation means (5). Thereby, the information of both the selected rectangle regions and specified modifications are stored in Modification information storage means (3). Modification image making means (6) then makes the image data modified based on the information of the selected rectangle regions, the specified modification information, and the input image data, and Image output means (7) outputs the modified image.

12 Claims, 24 Drawing Sheets

FIG. 4
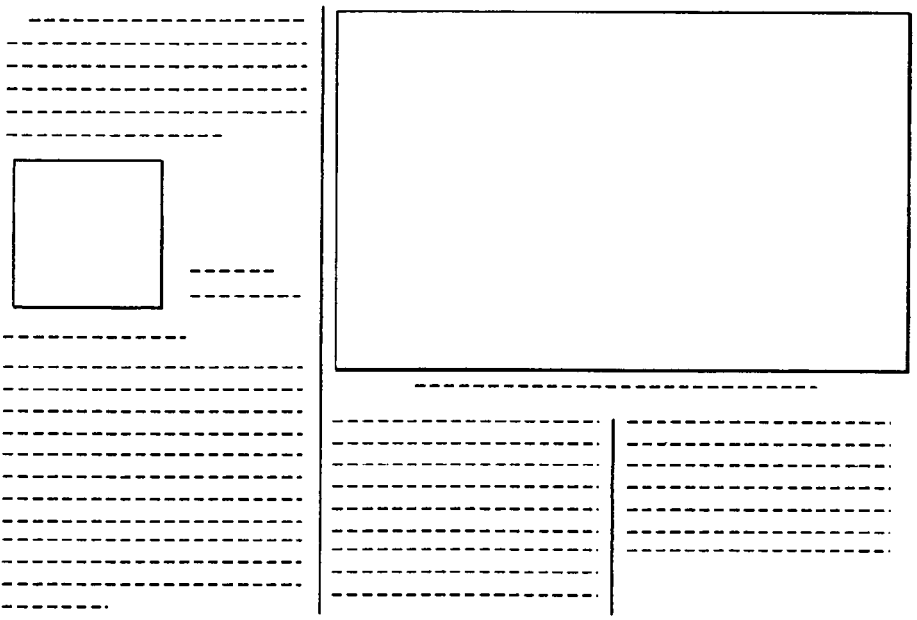
RISO Lab.Times
INITIAL PREPARATION
NUMBER OF MAGAZINE
MAY. 30
GREAT ATHLETIC
MEETING
TEAM A IS CHAMPION ! !
§ OVERCOME POWERFUL TEAM C ON SECOND MATCH OF SOFTBALL §
|        | TEAM A | TEAM B | TEAM C |
|--------|--------|--------|--------|
| SOFT 1 | ----   | ----   | ----   |
| SOFT 2 | ----   | ----   | ----   |
| KICK 1 | ----   | ----   | ----   |
| KICK 2 | ----   | ----   | ----   |
| ----   | ----   | ----   | ----   |
◇◇◇HIGHLIGHT◇◇◇
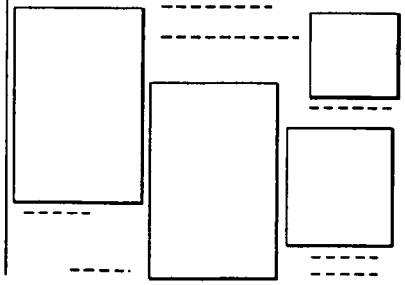

ORIGINAL IMAGE

スケッチ(手がき製版)する
左の写真は手がき製版しているところで
す。マスタブックを開くと、RGのマスタ
のような原紙が、台紙に軽く固定されて
います。これを外し、原紙と台紙の間にヤ

MAGNIFIED VIEW

FIG. 9

| CONDITION | ATTRIBUTE |
|---|---|
| Hs < Tk AND Ws/Hs > Tr<br>OR<br>Ws < Tk AND Hs/Ws > Tr | RULED LINE |
| WHEN DOES NOT SATISFY<br>CONDITION OF RULED LINE<br>AND<br>$Tk \leqq Hs < Tc$ | CHARACTER |
| WHEN DOES NOT SATISFY<br>ABOVE BOTH CONDITIONS | OTHERS |

FIG. 11

| CONDITION | ATTRIBUTE |
|---|---|
| IN BOTH VERTICAL AND HORIZONTAL DIRECTIONS THREE PEAKS | TABLE |
| IN BOTH VERTICAL AND HORIZONTAL DIRECTIONS TWO PEAKS | FRAME |
| DOES NOT SATISFY ABOVE BOTH CONDITIONS | PHOTOGRAPH |

RESULT OF REGION CUTTING

FIG. 24

| POSITION OF RECTANGLE REGION | ATTRIBUTE | CONTENT OF MODIFICATION |
|---|---|---|
| TOPMOST LINE | HEADER | REVERSE |
| | ITEMS OF TABLE | SHADE |
| | | |

DOCUMENT MODIFICATION APPARATUS AND IMAGE PROCESSING APPARATUS

CROSS-REFERENCE TO RELATED APPLICATION

This application is based upon and claims the benefit of priority from the prior Japanese Patent Application No. 2000-012034, filed Jan. 20, 2000; the entire contents of which are incorporated herein by reference.

BACKGROUND OF THE INVENTION

1. Field of the Invention

The present invention relates to a document modification apparatus and an image processing apparatus equipped with the document modification apparatus, for modifying image data obtained by reading a manuscript such as a document.

2. Description of the Related Art

Conventional document modification apparatuses have performed crosshatching, underlining, and enhancing for characters and photo images in a target document to be modified. There are many types of the document modification apparatuses, which are well known, such as Tablet digitizer type, Coordinate input type, Document region reading type, and so on. Those conventional document modification apparatuses have following drawbacks.

In the tablet digitizer type, an operator specifies an optional region in a document placed on a digitizer by using a pencil, and also designates a modification type for the designated region, and after this, it is necessary for the operator to put the document on the document table again. Accordingly, there is a drawback that this type of the conventional document modification apparatuses causes a shift of a position to be modified.

In the coordinate input type, the coordinate of a target modification region observed from the standard point is predicted by an operator in advance under the state that the document is set on the document table, and it is then necessary for the operator to input this coordinate through an operation section. This introduces a drawback to take more time.

In the document region reading type, it is necessary for an operator to mark directly a region in a document to be modified by using a marker pencil. Accordingly, this type of the conventional document modification apparatuses causes a drawback to stain the document with ink.

In order to eliminate those conventional drawbacks described above, a conventional pre-scan display method has been proposed, in which an image input means reads the document placed on a document table and a display device then displays the image of the document. The operator then specifies a region in the document to be modified while watching the image on the display device. In particularly, there is a region specifying method of extracting a target region from a document and of specifying a modification information for the extract region, that has been disclosed in the Japanese patent document (Japanese laid open publication No. 4-157876). In order to increase the precision of the designation of the modification position, this conventional technique uses a method of designating the region by extracting a binary image region in the original document and an intermediate graduation region and by displaying a distribution relationship of them. This also causes to decrease the operator's work during the designation process for the modification position.

By the way, although the above conventional technique of Japanese laid-open publication No. 4-157876 can handle a document, as a target to be modified, only including characters and photographs, it cannot separate characters and cut characters from a table and a frame in a document, and it further cannot cut cells from a table in a document. Thus, the conventional techniques have drawback to limit the types of the documents as the target to be modified.

SUMMARY OF THE INVENTION

Accordingly, an object of the present invention is, with due consideration to the drawbacks of the conventional technique, to provide a document modification apparatus and an image processing apparatus equipped with the document modification apparatus with a high versatility, which are capable of reducing the operator's work to handle a document including characters, a photograph, a table, a ruled line, and a frame, and capable of performing the modification process efficiently.

In accordance with a preferred embodiment of the present invention, a document modification apparatus for modifying image data read by image input means comprises region extracting means, region attribute judgment means, region selection means, modification specifying means, and modification image making means. The region extracting means extracts rectangle regions as the target regions to be modified from the input image data. The region attribute judgment means judges whether an attribute of each rectangle region is one of at least more than two kinds of attributes "character", and "photograph". The region selection means selects target regions to be modified from the plurality of regions through an operator. The modification specifying means specifies kinds of the modifications for the target regions selected by the region selection means through the operator. The modification image making means makes a modified image, based on the kinds of the modifications, in the regions in the image data selected by the region selection means, specified by the modification specifying means.

In the document modification means according to the present invention described above, the region attribute judgment means judges whether an attribute of each rectangle region that has been extracted is one of attributes such as "character", "photograph", "table", "ruled line", and "frame". Each of the attributes that have been set in advance is one of "character", "photograph", "table", "ruled line", and "frame".

In the document modification means according to the present invention described above, the region extracting means integrates the rectangle region, whose attribute has been judged as "character" by the region attribute judgment means, per line and paragraph, and the region selection means selects the target region to be modified per line and paragraph through the operator.

In the document modification means according to the present invention described above, the region extracting means displays on a display screen the rectangle regions extracted by the region extracting means with the image data read by the image input means, and selects whether each rectangle region on the display screen is modified or not through the operator.

In the document modification means according to the present invention described above, the region selection means moves the cursor to the rectangle region in the input image and blinks the rectangle region indicated by the cursor so that the operator selects whether this rectangle region is modified. After the selection of the rectangle region to be modified, the region selection means moves the cursor the following rectangle region. These operations are repeated.

In the document modification means according to the present invention described above, the modification instruction means displays an at-a-glance menu showing the information regarding the kinds of the modification, and selects the modification, to be applied to the selected rectangle regions, from the kinds of the modifications shown in the at-a-glance menu through the operator.

In the document modification means according to the present invention described above, the modification image making means comprises memory means for storing position information of the selected rectangle regions by the region selection means and the modification information regarding the kinds of the modifications specified by the modification specifying means, and the modification image making means performs the modification for the image data read by the image input means based on the position information and the modification stored in the memory means.

In the document modification means according to the present invention described above, the apparatus further comprises resolution conversion means for changing a resolution of the input image data to a reduced image; and display means for displaying the reduced image obtained by the resolution conversion means with the rectangle regions extracted by the region extracting means.

In accordance with another preferred embodiment of the present invention, a document modification apparatus for modifying image data read by image input means comprises region extracting means, automatic modification means, and modification image making means. The region extracting means extracts a plurality of regions from the image data, each region being a unit to be modified. The automatic modification means automatically selects target regions to be modified from the plurality of regions, and automatically modifies the selected target regions based on modifications that have been set in advance. The modification image making means makes an image modified image in the target regions selected by the automatic modification means based on the kinds of the modifications determined by the automatic modification means.

In the document modification means according to the present invention described above, the automatic modification means determines the kind of the modification to be applied to each selected target region in consideration of the attribute for the selected target region and the position of the selected target region in the input image data.

In the document modification means according to the present invention described above, the region extracting means comprises region attribute judgment means for judging an attribute of each region, and the attribute of each region to be judged by the region attribute judgment means is one of attributes "character", "photograph", "table", "ruled line", and "frame".

In the document modification means according to the present invention described above, the image input means converts the input image data to binary image data.

In accordance with another preferred embodiment of the present invention, an image processing apparatus comprises image input means for reading image data from a document, the document modification apparatus of the present invention for making modified image by modifying the input image data obtained by the image input means, and image output means for outputting the modified image obtained by the document modification apparatus.

BRIEF DESCRIPTION OF THE DRAWINGS

These and other objects, features, aspects and advantages of the present invention will become more apparent from the following detailed description of the present invention when taken in conjunction with the accompanying drawings, in which:

FIG. 4 is a diagram showing an input image;

FIG. 9 is a diagram of a table showing judgment data items to be used in the judgment whether an extracted rectangle region is one of attributes, character, ruled line, or other;

FIG. 11 is a diagram of a table showing judgment data items to be used in the judgment whether an extracted rectangle region is one of attributes, photograph, table, or frame;

FIG. 24 is a diagram showing an example of data in a table set in an automatic modification means shown in FIG. 23.

DESCRIPTION OF THE PREFERRED EMBODIMENTS

Other features of this invention will become apparent through the following description of preferred embodiments which are given for illustration of the invention and are not intended to be limiting thereof.

First Embodiment

Figure 1:
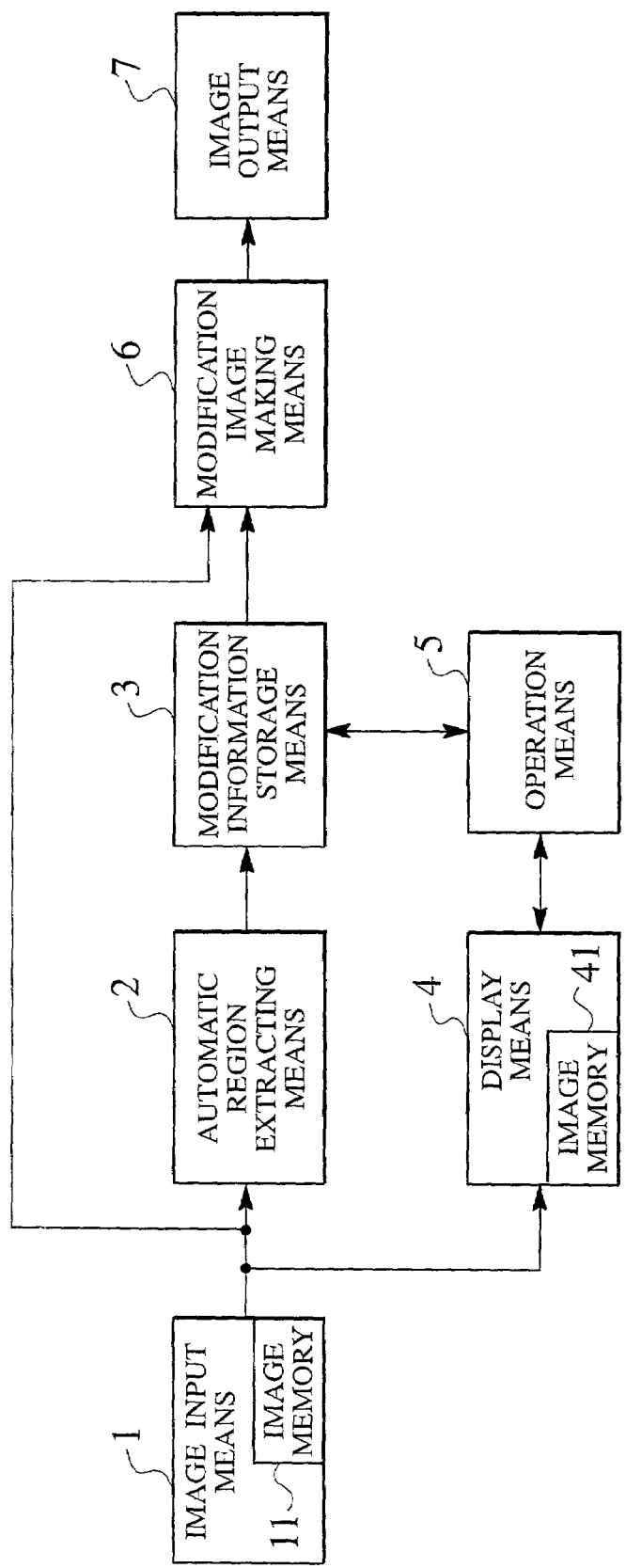
FIG. 1 is a block diagram showing an image processing apparatus equipped with a document modification apparatus according to a first embodiment of the present invention.

FIG. 1 is a block diagram showing the image processing apparatus equipped with the document modification apparatus according to the first embodiment of the present invention.

The image processing apparatus comprises: an image input means 1; an automatic region extracting means 2; a modification information storage means 3; a display means 4; an operation means 5; a modification image making means 6; and an image output means 7.

The image input means 1 reads a target document to be modified and inputs it therein. The automatic region extracting means 2 (corresponding to both region extracting means and region attribute judgment means in claims) extracts each attribute such as a character, a photograph, a table, a ruled line, a frame, and so on from the target document that has been read by the image input means 1. The modification information storage means 3 stores position information of the extract region and kinds of modification information to be applied to the extract region. The display means 4 displays the input image of the document, each extract image that is extracted from the input image of the document, an image as a target of the modification designated by an operator, and a finally modified image. Through the operation means 5, an operator specifies a desired modification to the extract regions in the image displayed on the display means 4. The modification image making means 6 makes a modified image obtained by modifying the image of the input document according to the designation of the operator. The image output means 7 prints the modified image on a print sheet.

Figure 2:
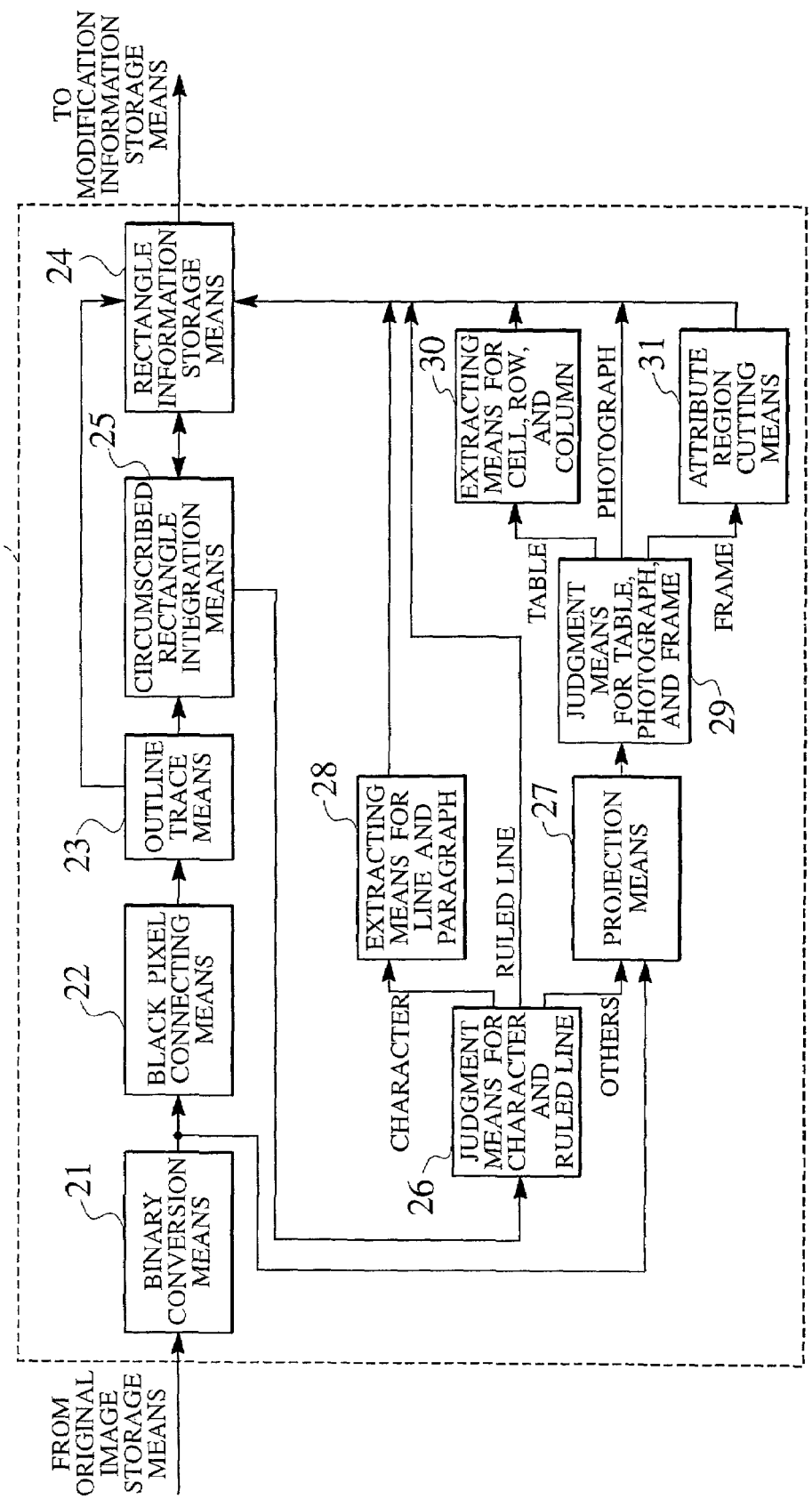
FIG. 2 is a block diagram showing an example of a detailed configuration of an automatic region extracting means shown in FIG. 1.

FIG. 2 is a block diagram showing an example of a detailed configuration of the automatic region extracting means shown in FIG. 1. As shown in FIG. 2, the automatic region extracting means 2 comprises: a binarization means 21; a black pixel connecting means 22; an outline trace means 23; a rectangle information storage means 24; a circumscribed rectangle integration means 25; a judgment means 26 for character and ruled line; a projection means 27; an extracting means 28 for line and paragraph; a judgment means 29 for table, photograph, and frame; an extracting means 30 for a cell, a row, and a column; and an attribute region extracting means 31.

The binarization means 21 converts the original image data into binary image data. The black pixel connecting means 22 connects binary black pixels (binary black picture elements). The outline trace means 23 makes an outline image of the binary black pixel block (binary black picture element block).

The rectangle information storage means 24 stores position information for the rectangle that is circumscribed to the outline image obtained by the outline trace means 23, and also stores position information of a line and paragraph to the rectangle region of the original image data, and position information of a region extracted out per attribute, "cell", "row", "column", and "frame" in a rectangle region that have been processed by projection process.

The circumscribed rectangle integration means 25 integrates rectangle regions that are overlapped or circumscribed to each other based on the position information of the rectangles stored in the rectangle information storage means 24.

The judgment means 26 for character and ruled-line judges whether each rectangle region, that has been integrated, corresponds to each of the attributes such as "character", "ruled-line", and so on.

The projection means 27 takes a projection of the rectangle region of the original image data of the attributes other than the attribute "character". The extracting means 28 for line and paragraph extracts a line and a paragraph from the rectangle region after the completion of the projection process. The judgment means 29 for table, photograph, and frame judges whether the rectangle region after the completion of the projection process is one of a table, a photograph, and a frame.

The extracting means 30 for cell, row, and column extracts a cell, a row, a column from the rectangle region that has been judged as a table or a photograph. The attribute region extracting means 31 extracts a region per attribute of image data from the rectangle region that has been judged as a frame.

Contents stored in the rectangle information storage means 24 are outputted and then stored in the modification information storage means 3.

Figure 3:
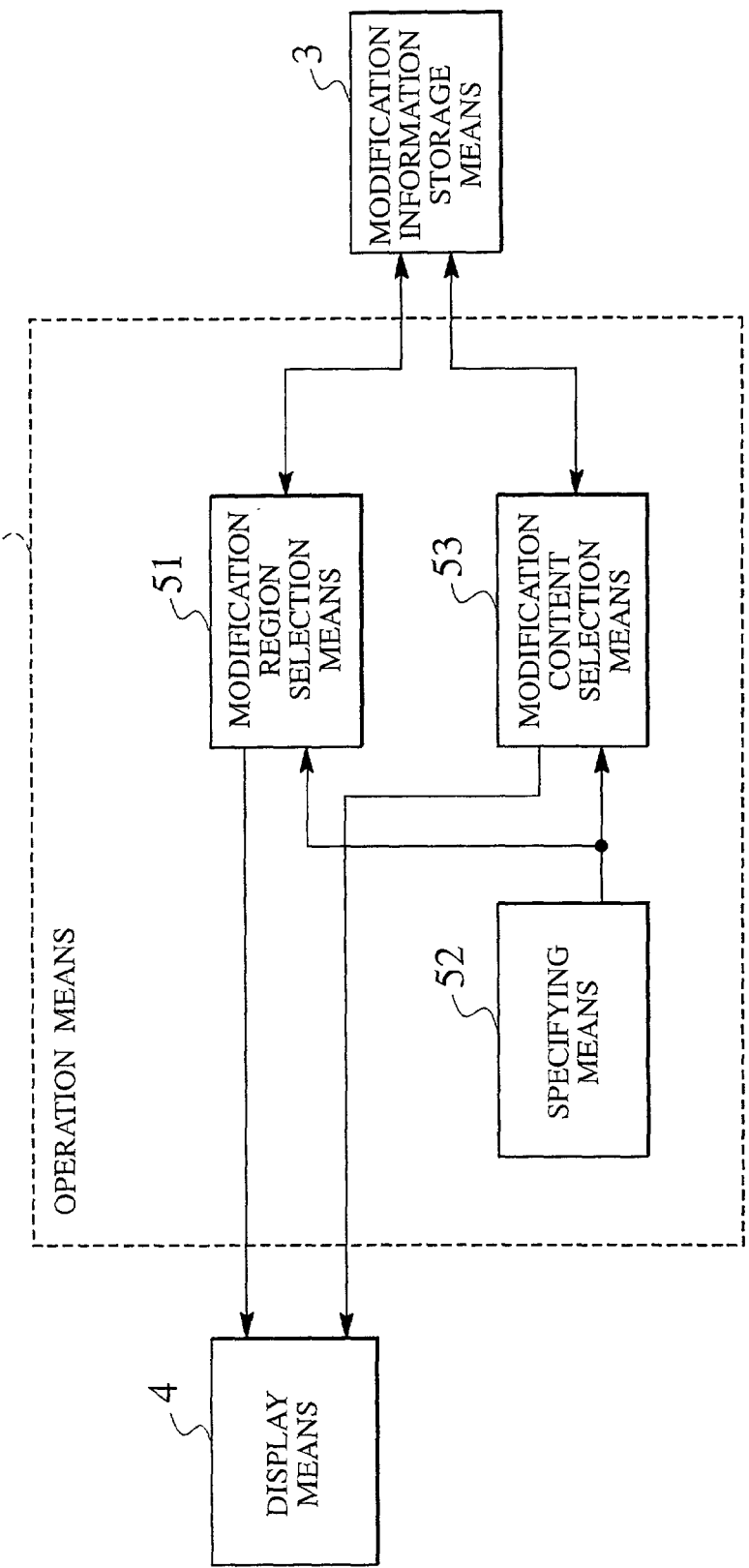
FIG. 3 is a block diagram showing a detailed configuration of an operation means shown in FIG. 1.

FIG. 3 is a block diagram showing a detailed configuration of the operation means 5 shown in FIG. 1. The operation means 5 comprises: a specifying means 52; a modification region selection means 51; and a modification content selection means 53. The specifying means 52 selects a region as a target to be modified in the extract region displayed by the display means 4, and through which the operator determines and specifies a modification content for the selected region. The modification region selection means 51 selects the modification region by sequentially moving a cursor on the display means 4 according to the position information of the extract region stored in the modification information storage means 3 and the designated contents obtained from the specifying means 52. The modification content selection means 53 displays the menu of the modification contents (the kinds of the modification operations) for the region, for which the designation for the modification is provided, in which the extract region is displayed on the display means 4. The modification content selection means 53 further stores the modification content that has been designated into the modification information storage means 3.

Next, a description will be given of the operation according to the first embodiment.

When reading a target document to be modified, the image input means 1 obtains the input image, for example, as shown in FIG. 4. This input image is then stored into the image memory 11 (as image storage means) temporarily in the image input means 1.

This input image can be obtained as follows: When an operator instructs to start a pre-scan process, a light is irradiated onto the target document, and a line sensor such as CCD receives the reflected light from the target document and the CCD then converts the reflected light to electrical signals (density signals) as the input image.

After this process, both the automatic region extracting means 2, the display means 4, and the modification image making means 6 input the input images stored in the image memory 11 in the image input means 1.

The automatic region extracting means 2 judges whether the original image data as the input image belong to rectangle regions corresponding to one of attributes such as "character", "photograph", "table", "ruled line", and "frame", and then extracts the rectangle regions from the original image data. The automatic region extracting means 2 then groups the obtained rectangle regions into a character region per line or paragraph, a table region per cell, row, column, and table. The automatic region extracting means 2 then stores those grouped regions into the modification information storage means 3.

The automatic region extracting means 2 handles the important function, as one of the features of the present invention, for the modification to the image region of various kinds of the attributes.

Hereinafter, the operation of the automatic region extracting means 2 will be explained.

Figure 5:
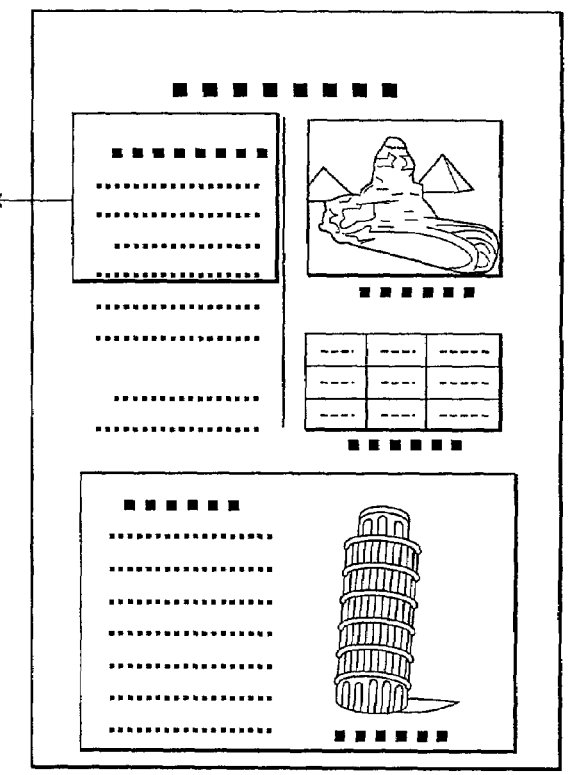
FIG. 5 is a diagram showing an example of a binary image that is converted from original image data.

The binarization means 21 inputs the original image data, for example, as shown in FIG. 5, stored in the image memory 11 in the image input means 1, and then converts the input image data to binary data. By the way, in the above operation, it is necessary to read the original image data with a resolution where the interval between adjacent lines in the binary data can be recognized. In this preferred embodiment, the pre-scan is performed with a resolution of 100 dpi.

Figure 6:
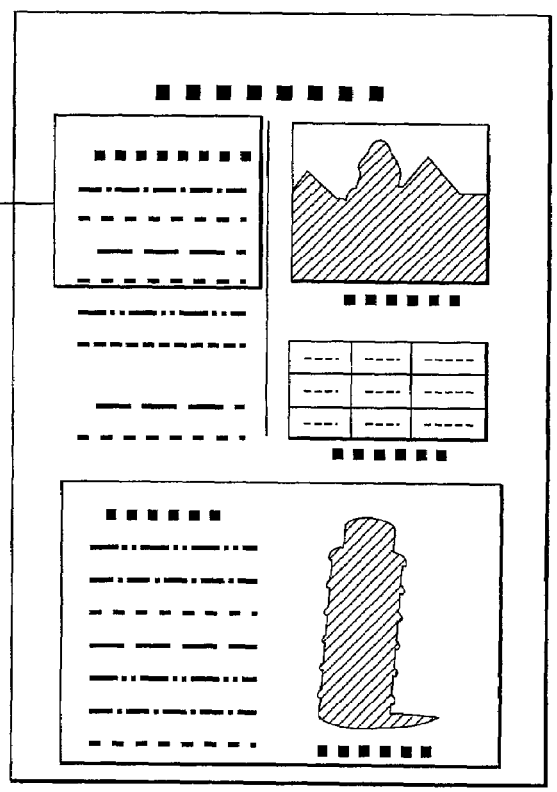
FIG. 6 is a diagram showing an example of an image after a black pixel connecting process has been completed.

The black pixel connection means 22 scans the binary data in a main scan direction. When continuous white pixels are not more than four pixels (3 pt), the black pixel connection means 22 converts these continuous white pixels into black pixels in order to obtain the image where the black pixel blocks are connected, as shown in FIG. 6. By the way, it is also possible to perform the outline trace process, that will be described later, instead of the above black pixel connection process.

However, the above black pixel connection process can eliminate smaller regions that cause the occurrence of a failure of the execution of the circumscribed rectangle integration process. In addition, the above black pixel connection process can decrease the total number of the black pixel blocks, and this can reduce the size of the data to be stored into the rectangle information storage means 23, that will be explained later.

The outline trace means 23 cuts circumscribed rectangles based on the well-known technique in which the outline of the black pixel block is traced. (For example, see "Digital picture processing", Azriel Rosenfeld, Avinash C. Kak, Academic Press, 1976.)

In a concrete example, the image data after the black pixel connection processing is scanned along the main scan direction, and the coordinate of the detected black pixel is used as a trace start coordinate, and the outline of the black pixel block is traced in order to obtain the outline image until the trace is returned to the trace start coordinate. Then, the position information for the rectangle circumscribed to this outline image is stored into the rectangle information storage means 24. This preferred embodiment reduces the processing time by omitting images that have already been detected in the rectangle region during the scan process.

The circumscribed rectangle integration means 25 integrates the rectangle regions that are overlapped and also circumscribed to each other based on the position information stored in the rectangle information storage means 24. Further, when the integration is performed, the circumscribed rectangle integration means 25 updates the position information stored in the rectangle information storage means 24 with the position information of the integrated rectangles.

Figure 7:
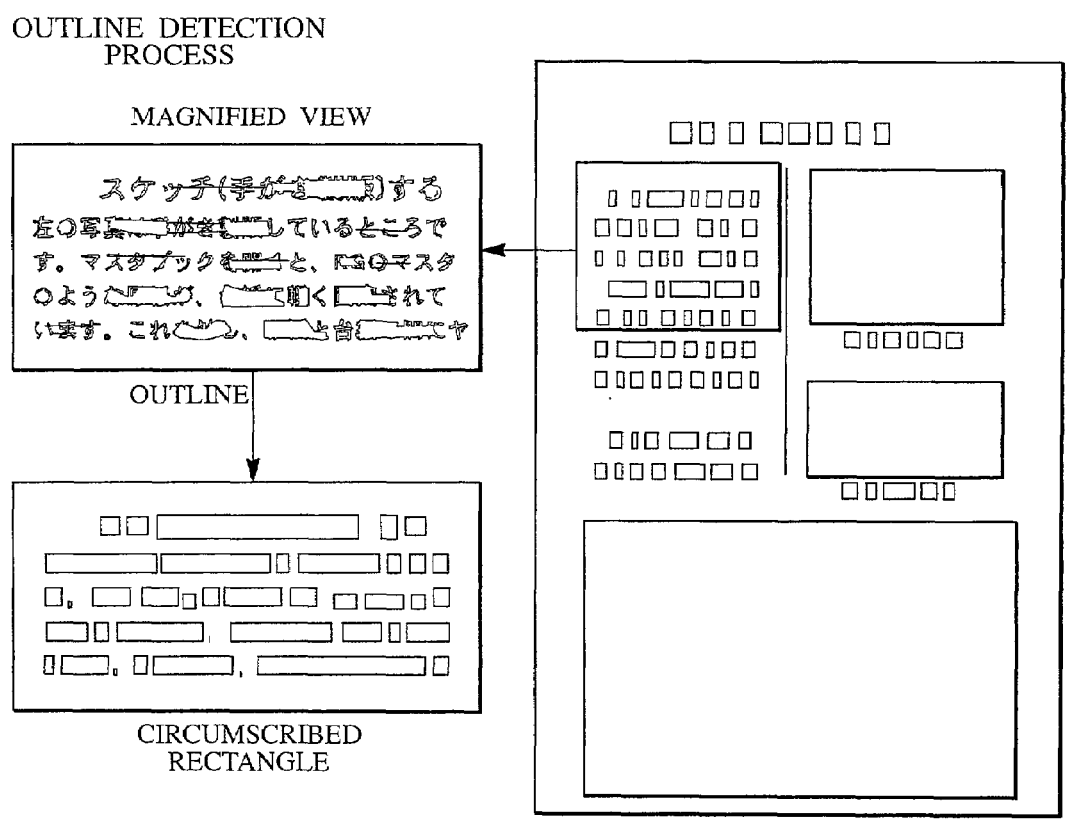
FIG. 7 is a diagram showing an example of a detected outline image and a circumscribed rectangle image after the outline has been detected.

This integration process obtains the circumscribed rectangle image, as shown in FIG. 7. In this embodiment, the condition of the circumscribed rectangle region is that the distance of a part, that is the mostly circumscribed between adjacent rectangles, is not less than three pixels (2 pt).

The regions that have been extracted by the above procedure are classified into one of the attributes, "character", "photograph", "table", "ruled line", and "frame".

Figure 8:
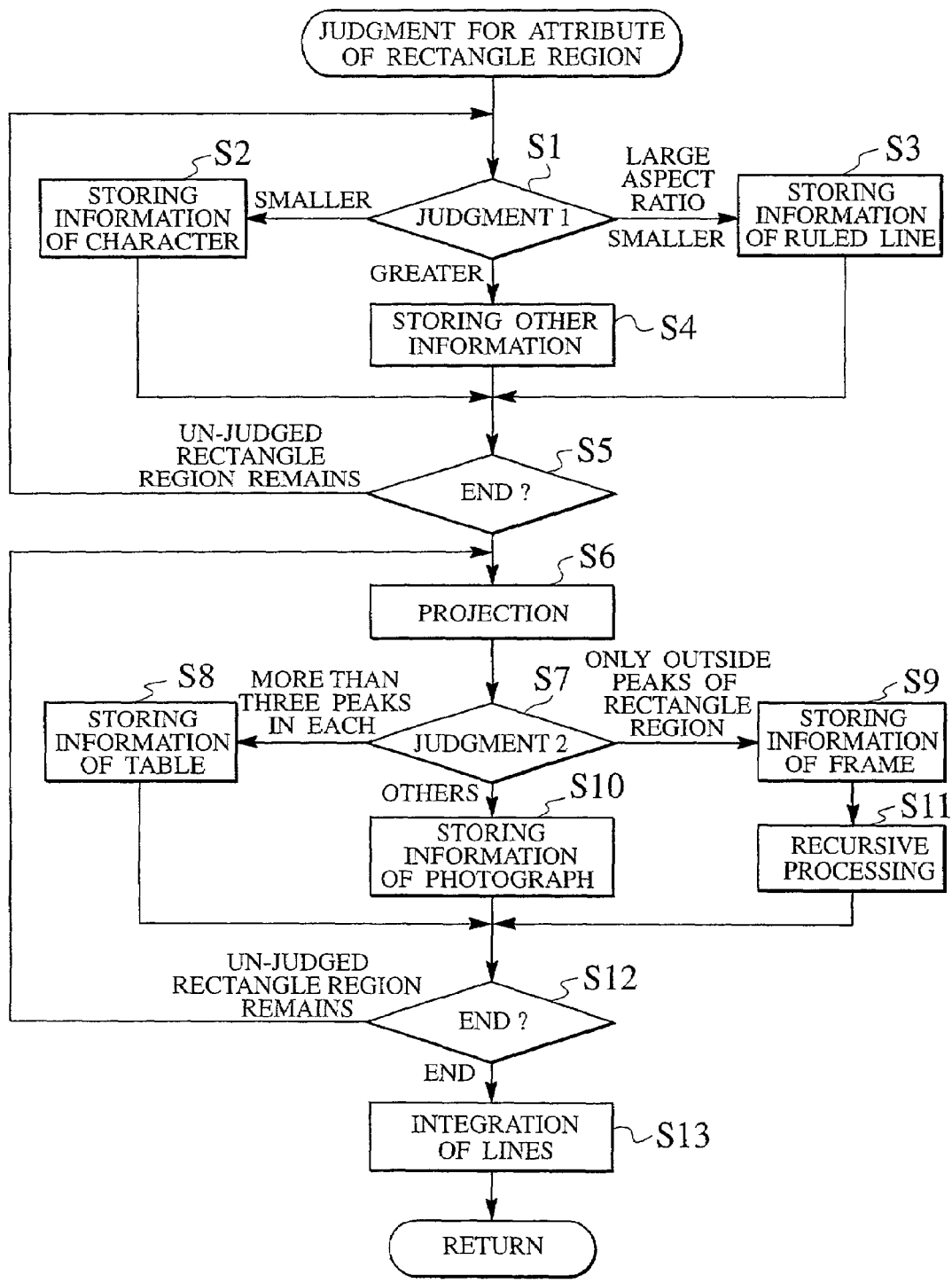
FIG. 8 is a flow chart showing a procedure of a region attribute judgment procedure process performed by the automatic region extracting means.

The operation for the above classification will be explained with reference to the flowchart shown in FIG. 8.

The judgment means 26 for character and ruled line calculates various values of each rectangle region such as a height Hs, a width Ws, an aspect ratio Hs/Ws (ratio of Height to Width), and Ws/Hs (ratio of Width to Height) based on the position information of the rectangle regions stored in the rectangle information storage means 24. In addition, the judgment means 26 compares the height Hs, the width Ws, the ratio Hs/Ws, the ratio Ws/Hs, and first to third threshold values, and judges whether each rectangle region is classified into one of attributes, "character", "ruled line", and "others" based on the conditions and attributes shown in the table of FIG. 9.

The attribute judgment results (character, ruled line) obtained are stored in the rectangle information storage means 23 at Steps S2 to S4. Those processes are repeated until there is no longer un-processed rectangle region (Step S5).

The results of the test for a plurality of target documents indicate that the height Hs of the attribute "character" is not less than 6 pt and less than 48 pt, the height Hs of the attribute "ruled line" is less than 6 pt, and each of the ratios Hs/Ws and Ws/Hs of the attribute "ruled line" is 16 times or more when compared with those of the attribute "character".

In the present embodiment, it has been set that the first, second, and third threshold values are Th=8 (6 pt), Tr=16, and Tc=66 (48 pt), respectively.

Next, a description will be given of the processing for the rectangle region that has been judged as the attribute "others".

Figure 10A:
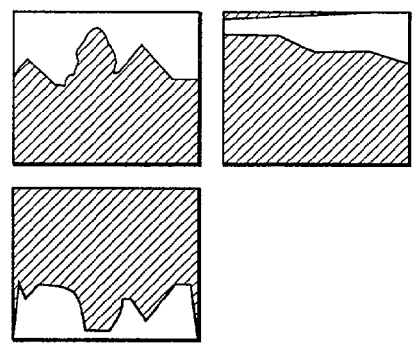
FIGS. 10A, 10B, and 10C are diagrams showing examples of images after a projection process has been completed.
Figure 10B:
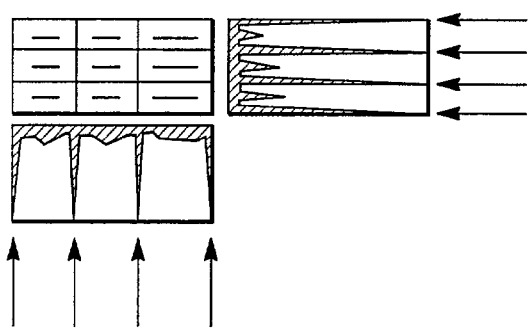
Figure 10C:
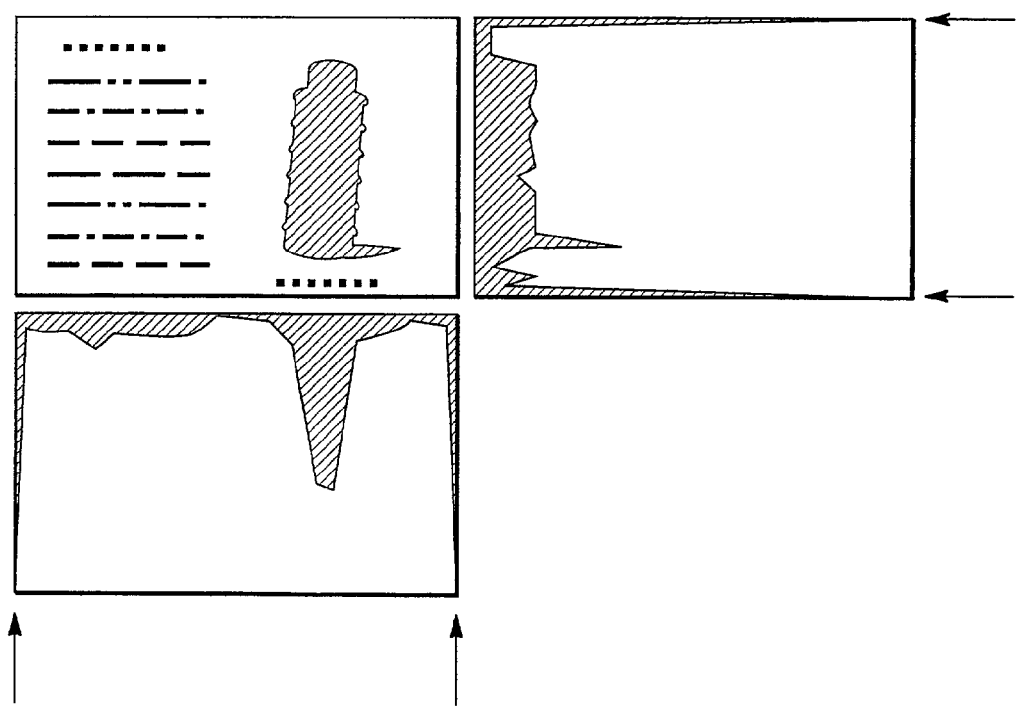

The projection means 27 executes the operation to obtain both projections of the original image data in vertical and horizontal directions corresponding to the rectangle region stored in the image memory means 11 in the image input means 1 at Step S6. FIGS. 10A, 10B, and 10C show the projection data obtained at Step S6.

At Step S7, the judgment means 29 for table, photograph, and frame judges whether the attribute of the rectangle region is one of a table, a photograph, and a frame based on the conditions and attributes shown in FIG. 11 according to the number of peaks corresponding to the attribute "ruled line" whose height is adequately higher or whose width is narrower than the height Hs or the width Ws of the rectangle region.

For example, in FIG. 10A, one peak is detected from the projection data in horizontal direction. Thereby, the judgment means 29 judges that the attribute of the rectangle region shown in FIG. 10A is "photograph".

In addition, in FIG. 10B, four peaks are detected from the projection data in both vertical and horizontal directions. Thereby, the judgment means 29 judges that the attribute of the rectangle region shown in FIG. 10B is "table".

Similarly, in FIG. 10C, two peaks are detected from the projection data in both vertical and horizontal directions. Thereby, the judgment means 29 judges that the attribute of the rectangle region shown in FIG. 10C is "frame". The results of the judgment of the attribute are stored in the rectangle information storage means 23.

Then, in Step S8 for the rectangle region whose attribute has been judged as "table", the positions of cells in the rectangle region are determined based on the positions of the peaks in the projection data, and the positions of the cells, rows (cells are connected in row direction), and column (cells are connected in column direction) are stored into the rectangle information storage means 24.

Figure 12:
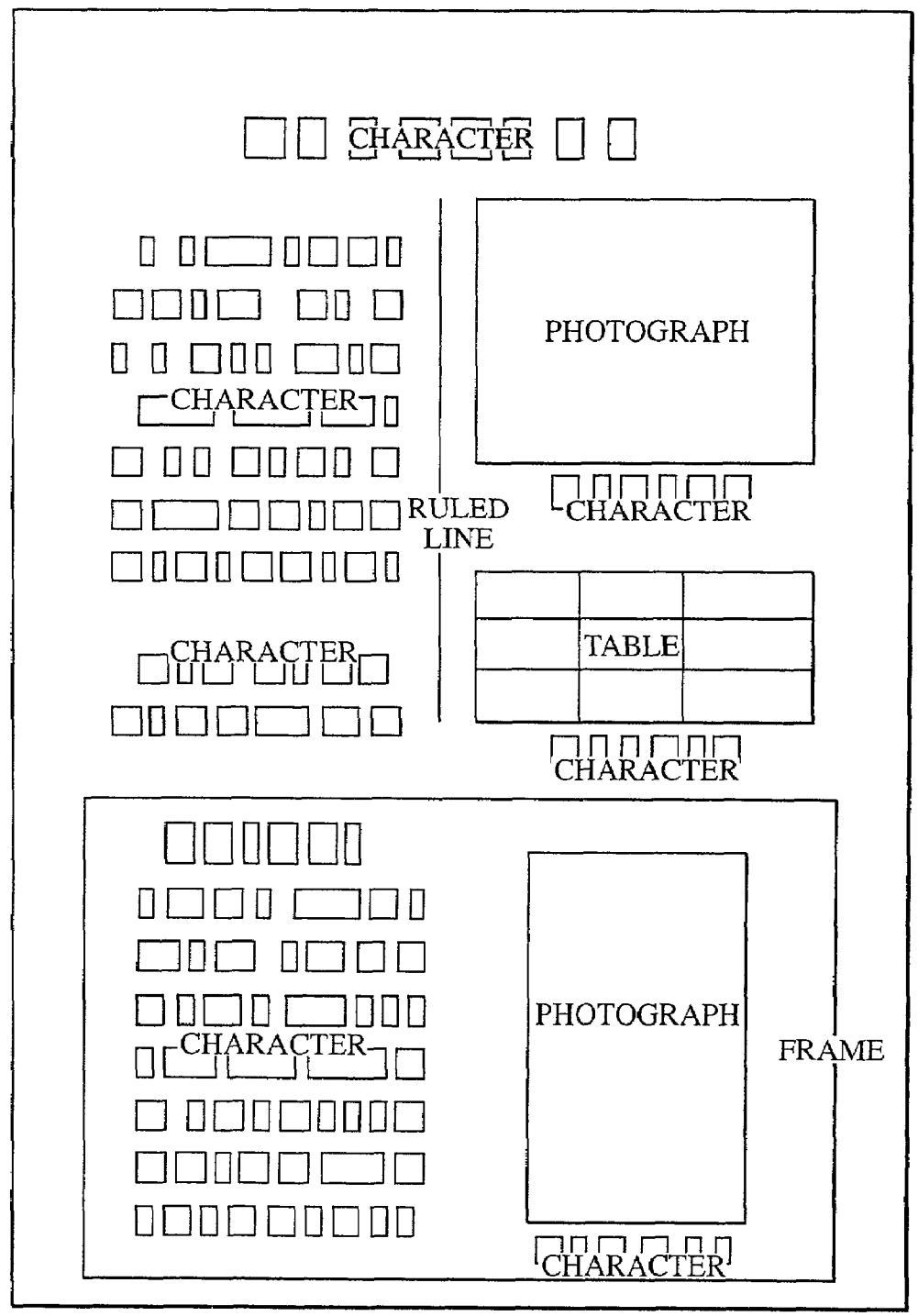
FIG. 12 is a diagram showing examples of extracted rectangle regions that are extracted per attribute.

In Steps S11 and S12 for the rectangle region whose attribute has been judged as "frame", a series of the processes, detection of a black pixel, the trace of an outline, the detection of a circumscribed rectangle, the integration of closed rectangles, and the judgment of attribute is performed recursively. Thereby, as shown in FIG. 12, in the image data in the frame is extracted into parts corresponding to the attributes of "character", "photograph", "table", and "ruled line".

In Step S13 for the rectangle region whose attribute has been judged as "character", rectangle regions having the possibility as being in a same line are extracted based on the coordinate in a sub-scan direction in each rectangle region, and then extracted them are grouped when they satisfy the following conditions:

In general, it is said that a person can read a document easily when a space between adjacent lines is 0.5 times of a height of a character and a space between adjacent paragraphs is 3 times of the height of the character. In this embodiment, these conditions are used as the conditions for making a group.

Figure 13A:
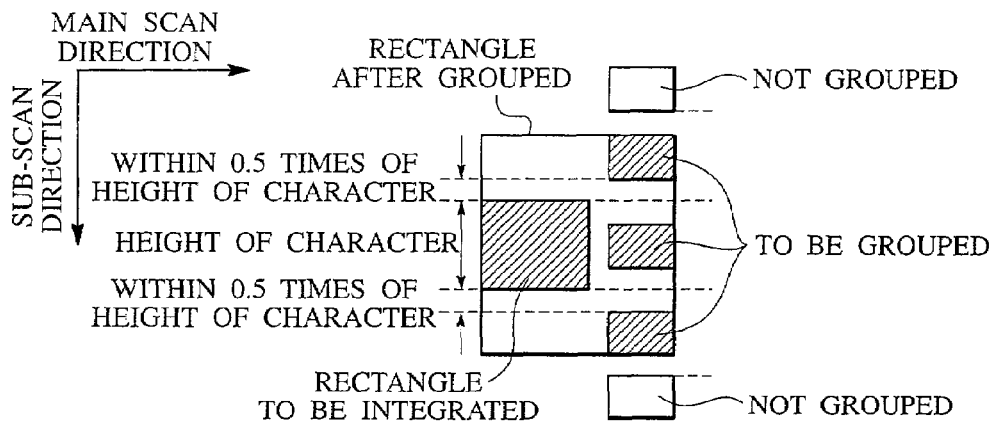
FIGS. 13A, 13B, and 13C are diagrams showing conditions for extracting lines in rectangle regions.
Figure 13B:
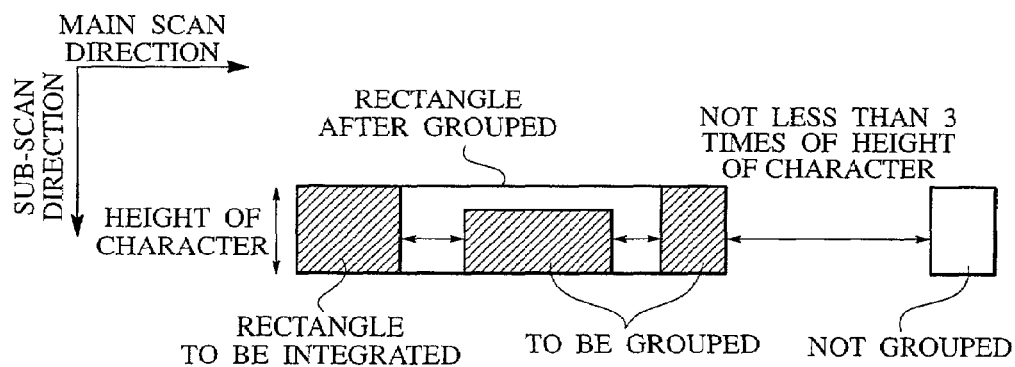
Figure 13C:
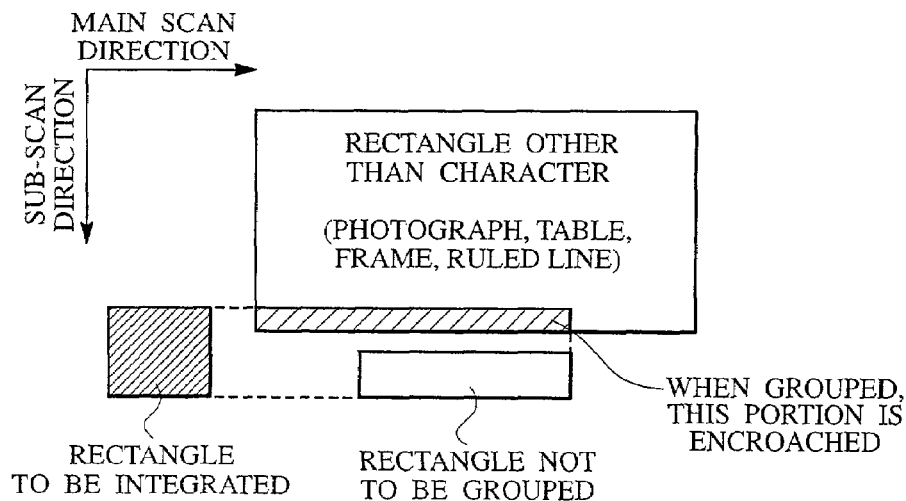

(A) Condition to extract "line" (see FIG. 13A to FIG. 13C)

FIG. 13A shows the extraction condition when an interval of the sub-scan direction in a rectangle is within 0.5 times of the height of a character, FIG. 13B shows the extraction condition when an interval of the main scan direction in a rectangle is within an interval of a paragraph and 3 times of the height of a character, and FIG. 13C shows the extraction condition to eliminate a case where a group is not overlapped with a rectangle region other than a character when target rectangles are grouped.

Condition 1: An interval of a sub-scan direction in a rectangle region is within 0.5 times of the height of a character.

Condition 2: An interval of a main-scan direction in a rectangle region is within an interval of adjacent paragraphs and 3 times of the height of a character.

Condition 3: It is not overlapped with a rectangle region of an attribute other than a character when grouped.

Figure 14:
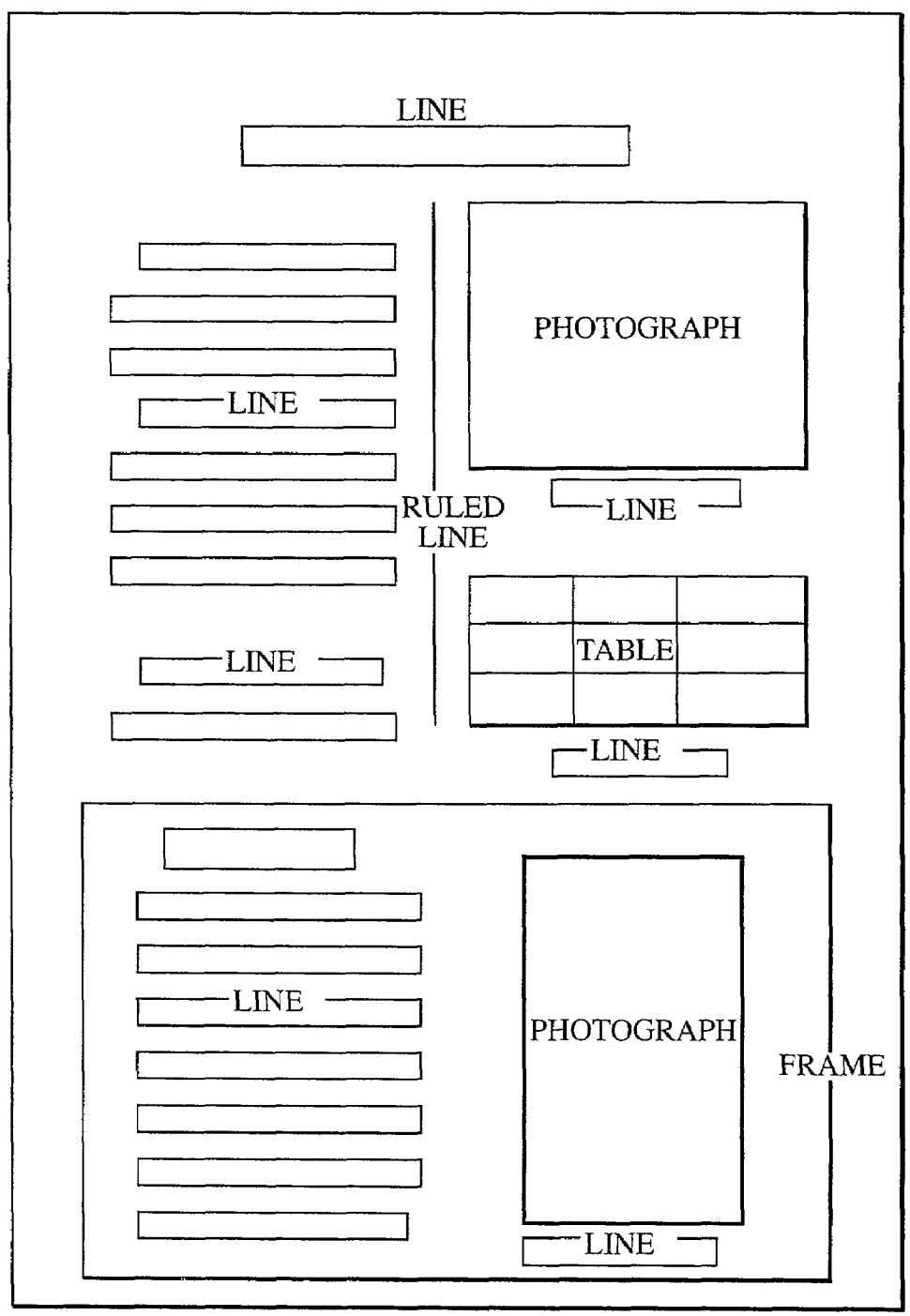
FIG. 14 is a diagram showing an example of the attributes of extract regions.

The grouping operation is repeated until there is no longer un-processed rectangle region. Thereby, as shown in FIG. 14, rectangle regions that have been extracted per line are obtained.

(B) Condition to extract "paragraph" (see FIGS. 15A and 15B, and FIGS. 16A to 16C)

Figure 15A:
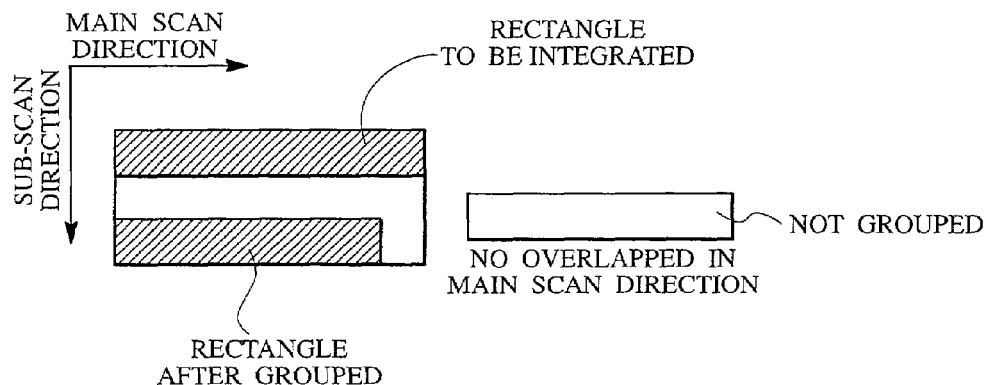
FIGS. 15A and 15B are diagrams showing conditions of extracting paragraphs in a rectangle region.
Figure 15B:
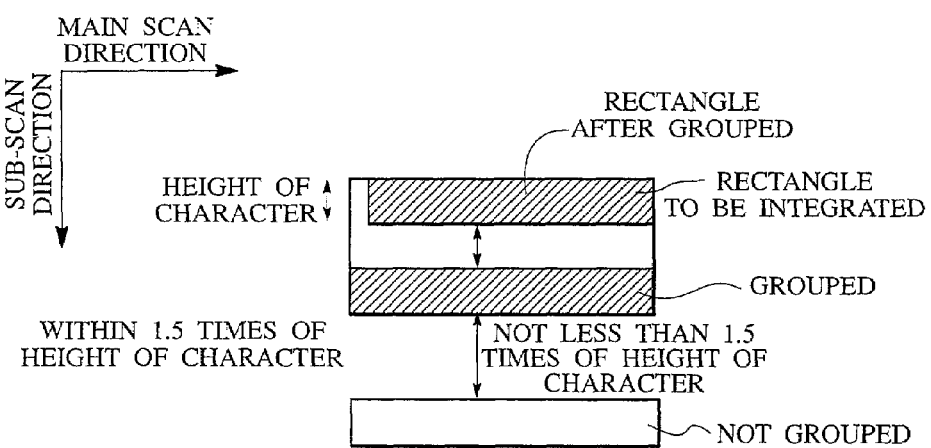
Figure 16A:
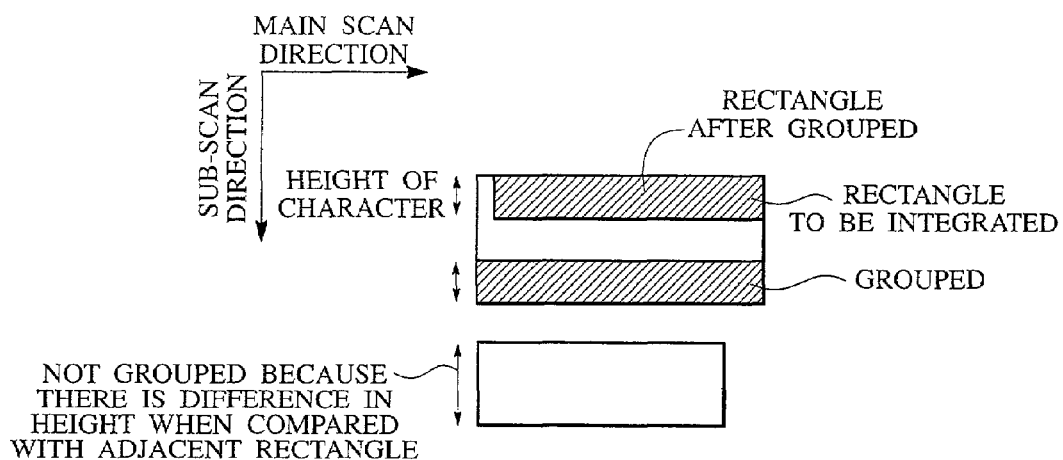
FIGS. 16A, 16B, and 16C are diagrams showing conditions for extracting paragraphs in a rectangle region.
Figure 16B:
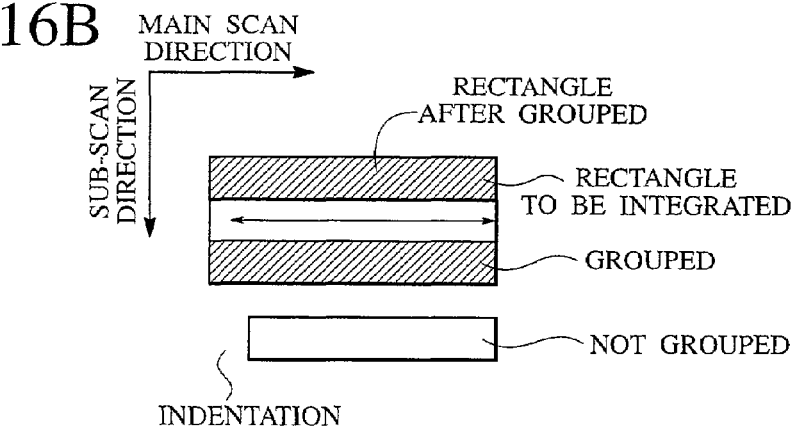
Figure 16C:
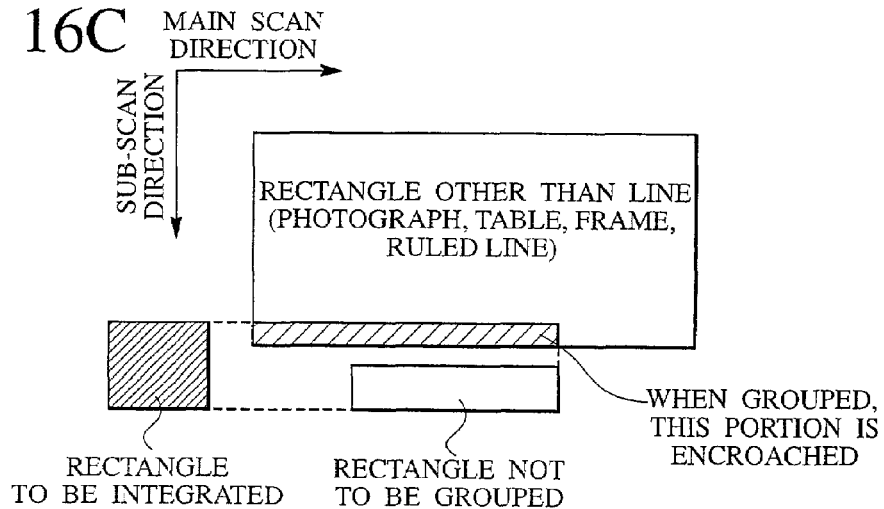
Figure 17:
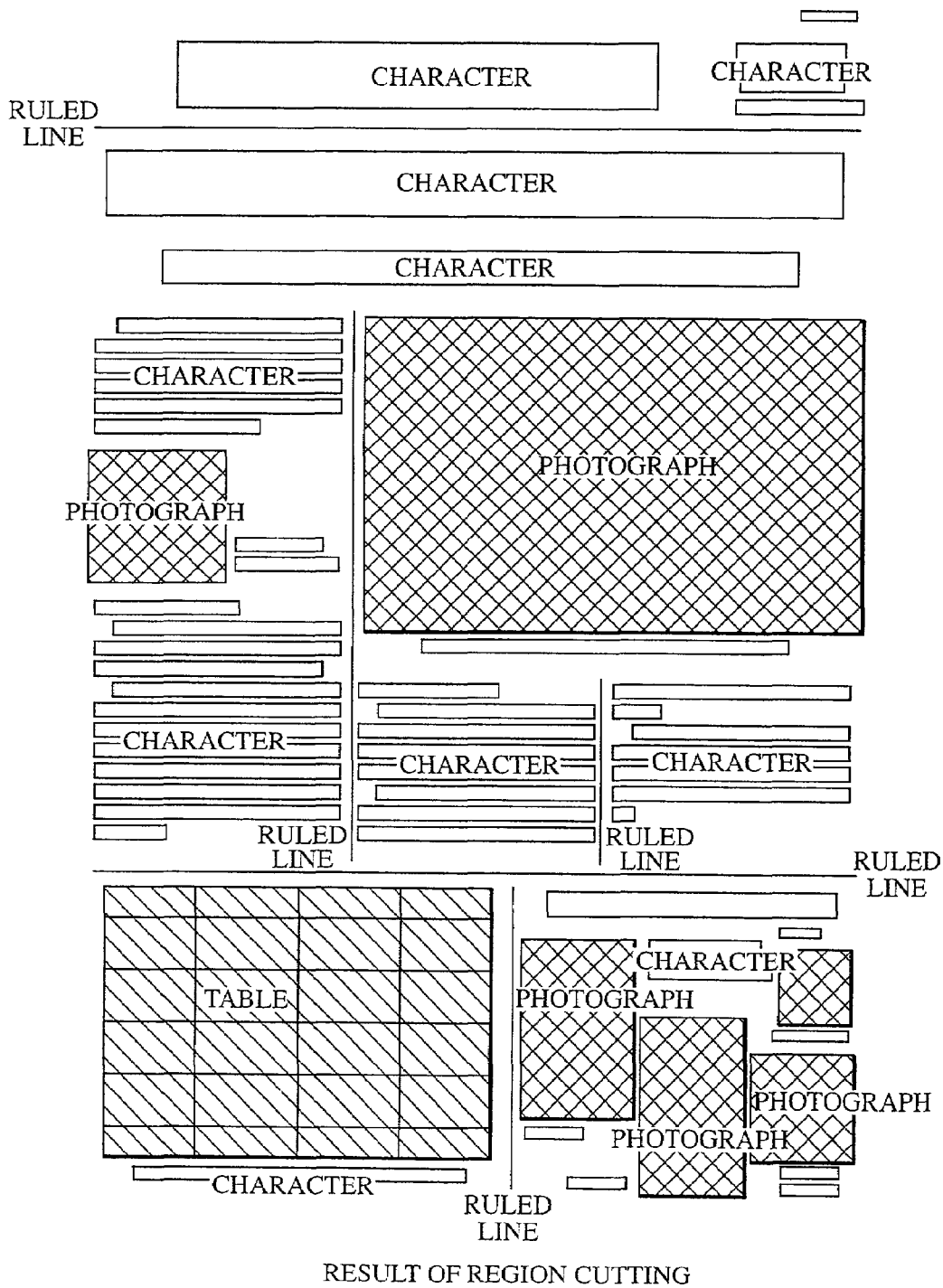
FIG. 17 is a diagram showing an example of a result of a region extract operation performed by the region extracting means.

FIG. 15A shows the extraction condition when there is overlapped in a main scan direction. FIG. 15B shows the extraction condition when an interval of a sub-scan direction in a rectangle region is within 1.5 times of the height of a character. FIG. 16A shows the extraction condition when a difference between heights of rectangles is within 3 pt. FIG. 16B shows the extraction condition when there is an indentation. FIG. 16C shows the extraction condition to avoid an overlap with another rectangle other than a line that has been grouped.

Condition 1: There is an overlap in a main scan direction.
Condition 2: An interval of lines per sub-scan direction is within 1.5 times of the height of a character.
Condition 3: A difference between heights of lines is within 3 pt.
Condition 4: There is no indentation.
Condition 5: There is no overlap with a region other than a line when grouped.

The grouping process is repeated until there is no longer un-processed rectangle region. Thereby, paragraphs can be extracted.

By performing the processes described above, the original image data are classified into rectangle regions corresponding to attributes such as "character", "photograph", "ruled line", and "frame". Further, the grouping per line or paragraph is performed for the rectangle region of the attribute "character", and the grouping per cell, row, column, and entire table is performed for the rectangle region of the attribute "table".

The region extract information of the original image data obtained by the processing performed by the automatic region extracting means 2 and detailed attribute information and others of the extract regions are stored in the modification information storage means 3.

Figure 18:
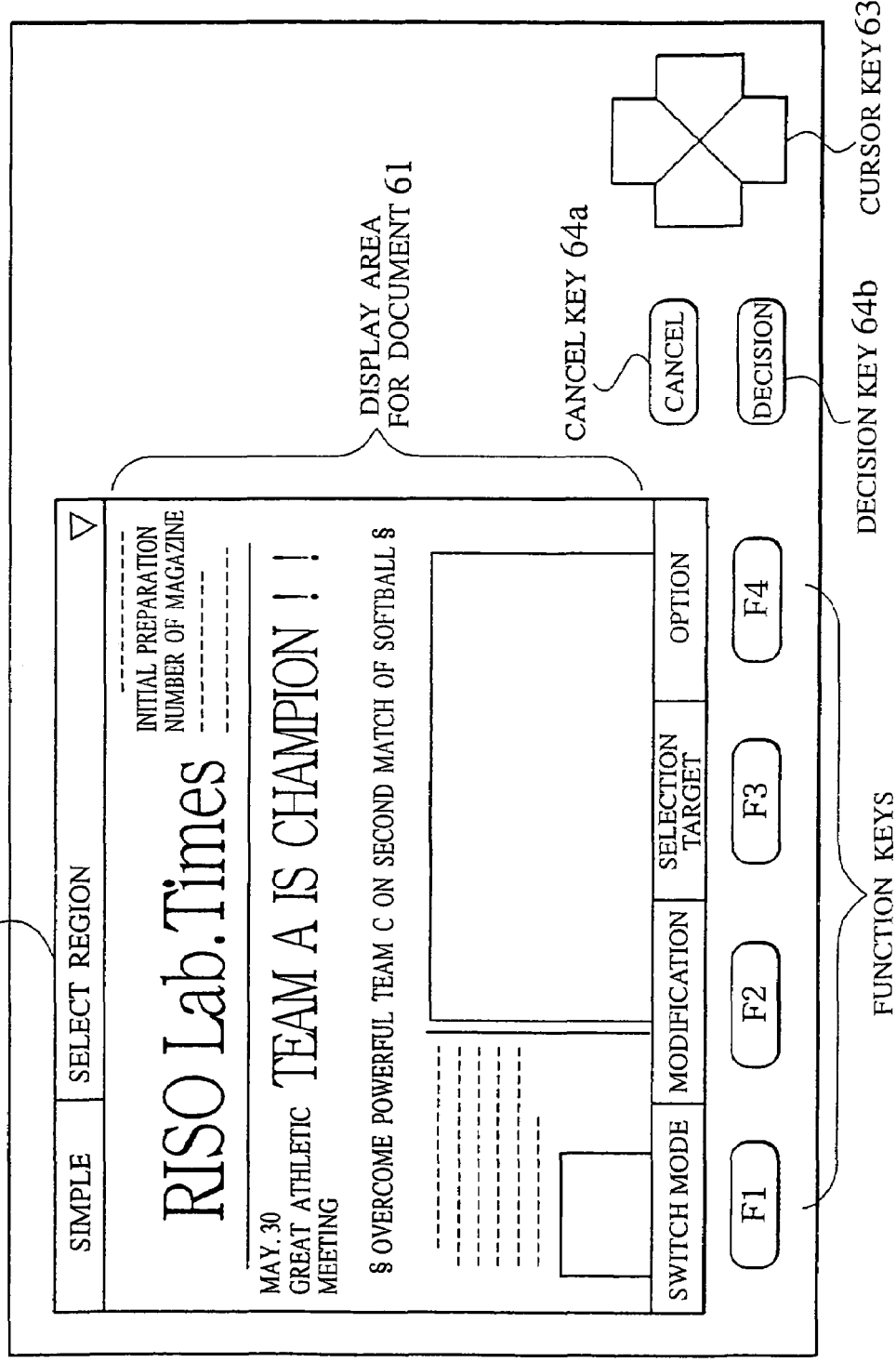
FIG. 18 is a diagram showing a display example on a display means.

After the region extracting process and the attribute judgment process are completed, the cursor to select the compressed image of the original image and the rectangle regions and the rectangle region that is currently selected are displayed on a LCD (Liquid Crystal Display) panel as the display means 4, as shown in FIG. 18.

On the display panel as the display means 4 shown in FIG. 18, the image that has been pre-scanned in the display area 61 for document is displayed so that the image are matched with the width of the display device (the LCD panel), and the operation content and the state of the modification and the like are displayed on the message area 62. In addition, on the display panel as the display means 4 shown in FIG. 18, the reference number 63 designates a cursor key to be used for selecting a region and a content of the modification, the reference number 64 denotes determination keys to be used for determining the region, the content of the modification, and also to be used for canceling the determined content. The reference symbols F1 to F4 indicate function keys for selecting functions according to the current situation. The keys 63, 64, F1, F2, F3, and F4 described above mean the specifying means 52 in the operation means 5.

In the first embodiment, the LCD panel of a low resolution (320×240 dots) is used as the display means 4.

When a document is not reduced in use of the display means 4 of a low resolution, only a part of the document is displayed. This resolution requires that the operator scrolls the cursor around all directions such as right, left, up, and down directions in order to watch the entire of the document. This causes a drawback to decrease the ease of the operation because the operator can hardly recognize which part of the document is displayed on the display means 4. On the contrary, when the document is reduced and then displayed, it is not necessary to scroll the cursor because the entire of the document can be displayed, but the operator can hardly watch the reduced document clearly.

Accordingly, in the present embodiment, the resolution of the original image data is so converted that the width of the original image data is fit to the width of the LCD panel (as the display means 4) and the operator then perform the scrolling only in up and down directions. This can increase the ease of the operation when compared with the case where the document is not reduced and displayed. In addition, this can increase the ease of the operation when compared with the case where the document is reduced and the entire of the document is displayed.

The operator gives following instructions in order to perform various modifications while watching the display contents on the display means 4 described above.

Figure 22:
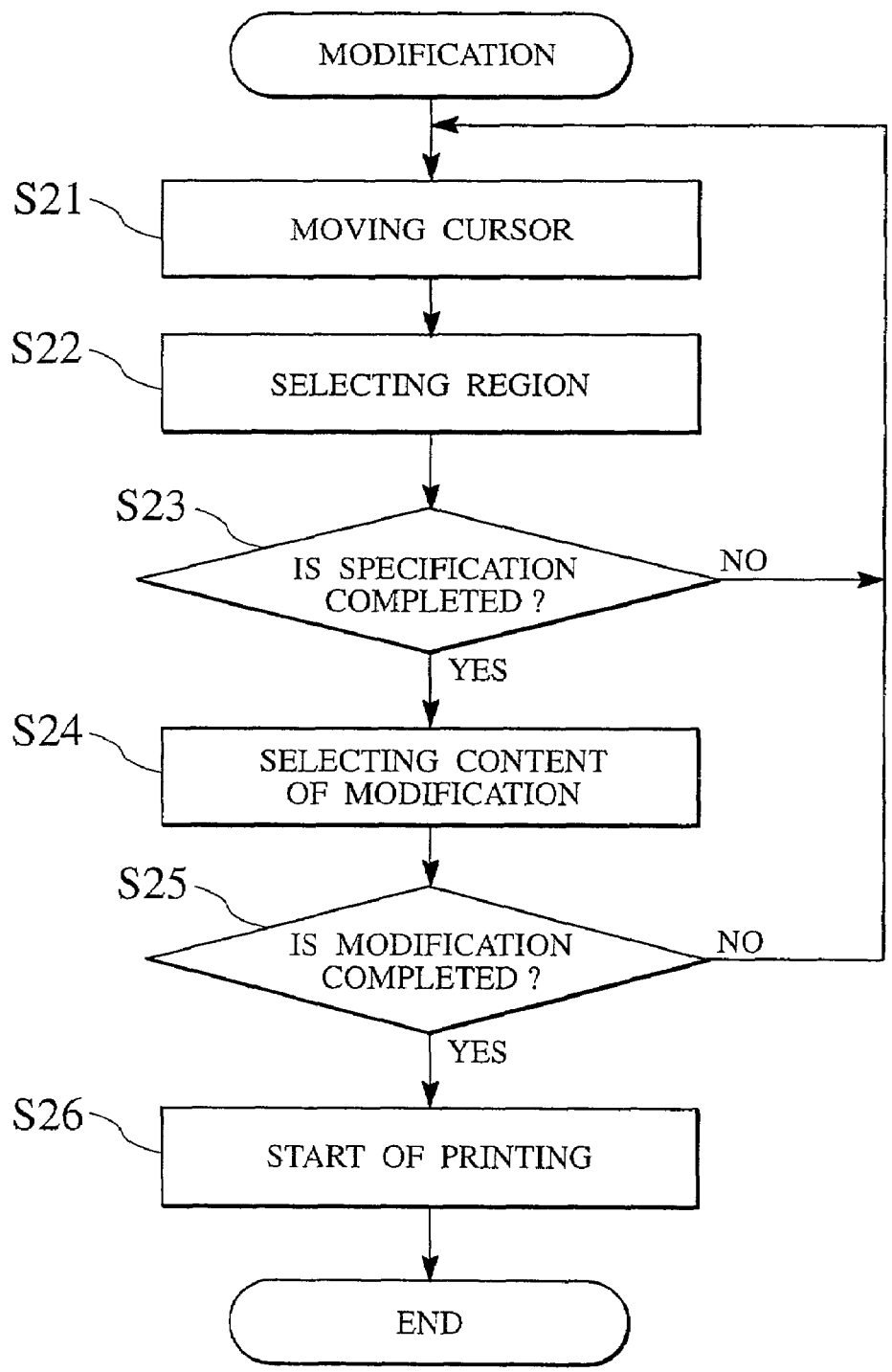
FIG. 22 is a flow chart showing an operator's procedure for selecting modification regions and for specifying modification contents.

The operation will be explained with reference to the flowchart shown in FIG. 22.

First, on the display image shown in FIG. 18, the cursor is displayed on the first extract region (a rectangle region) in raster order by the modification region selection means 51.

Figure 19:
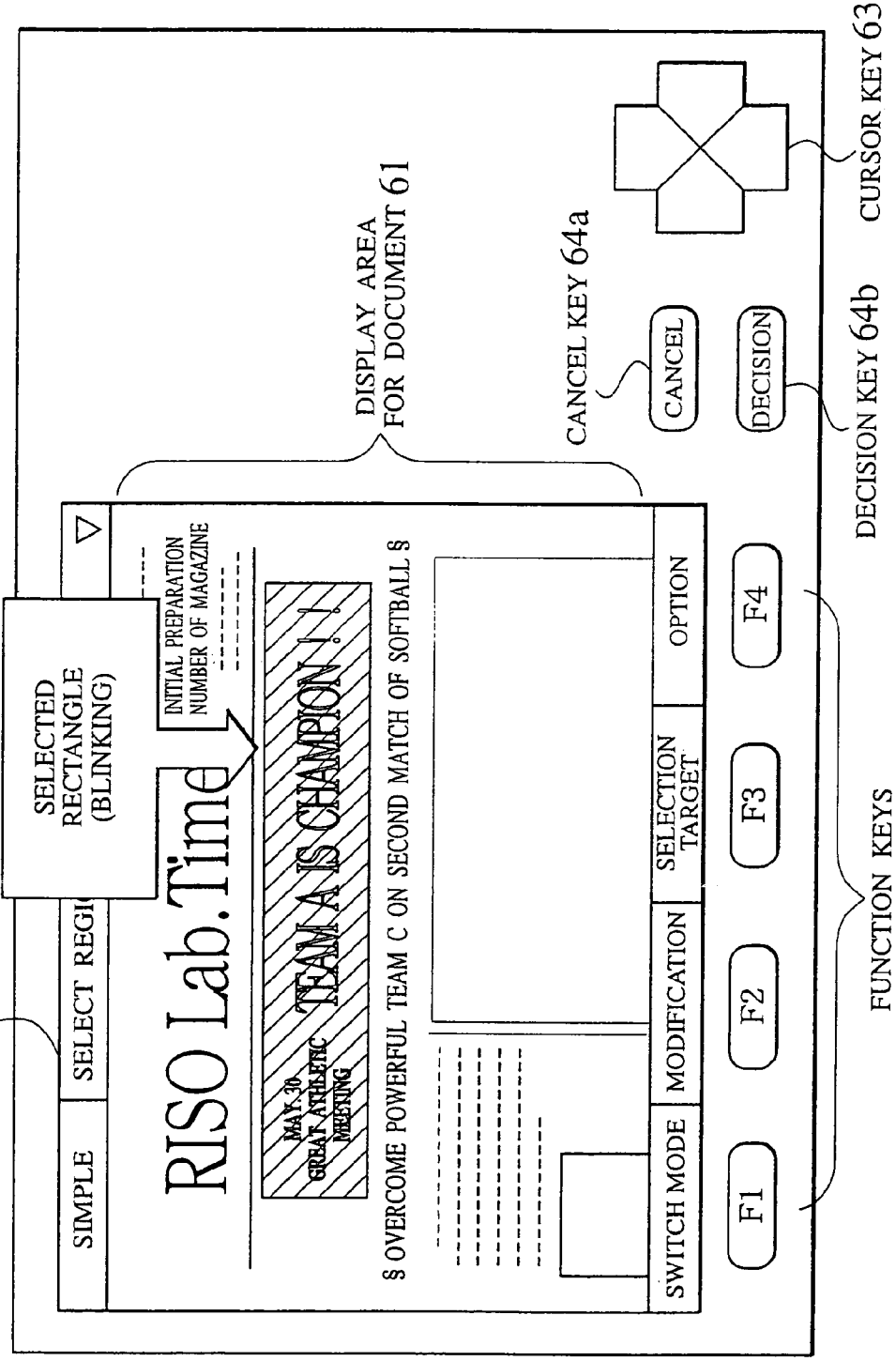
FIG. 19 is a diagram showing another display example on the display means.

(1) At Step S21, the operator moves the rectangle region to be modified by operating the cursor key 63 as the specifying means 52. FIG. 19 shows this state in which the rectangle region specified by the cursor is reversed and blinking. When the operator wants to modify the rectangle region specified by the cursor, the operator enters the decision key 64b at Step S22 in order to select the rectangle region to be modified. When the operator enters the cancel key 64a, the selected rectangle region is cancelled.

The operator repeats the above operations in order to perform the modification for all rectangle regions to be modified by using those keys 63, 64a and 64b until the specification for the rectangle regions is completed at Step S23.

By those operations, the target rectangle regions for the modification are determined and displayed in reverse. The target rectangle region to be moved is determined by the modification region selection means 51 based on the position information of the rectangle region that is currently referenced and the direction of the cursor key 63 that is now pushed. Further, by using a switch key (not shown) in the specifying means 52, the operator can switch the selection unit, line or paragraph in the character region, and cell, row, column, or the entire table in the table region.

Figure 20:
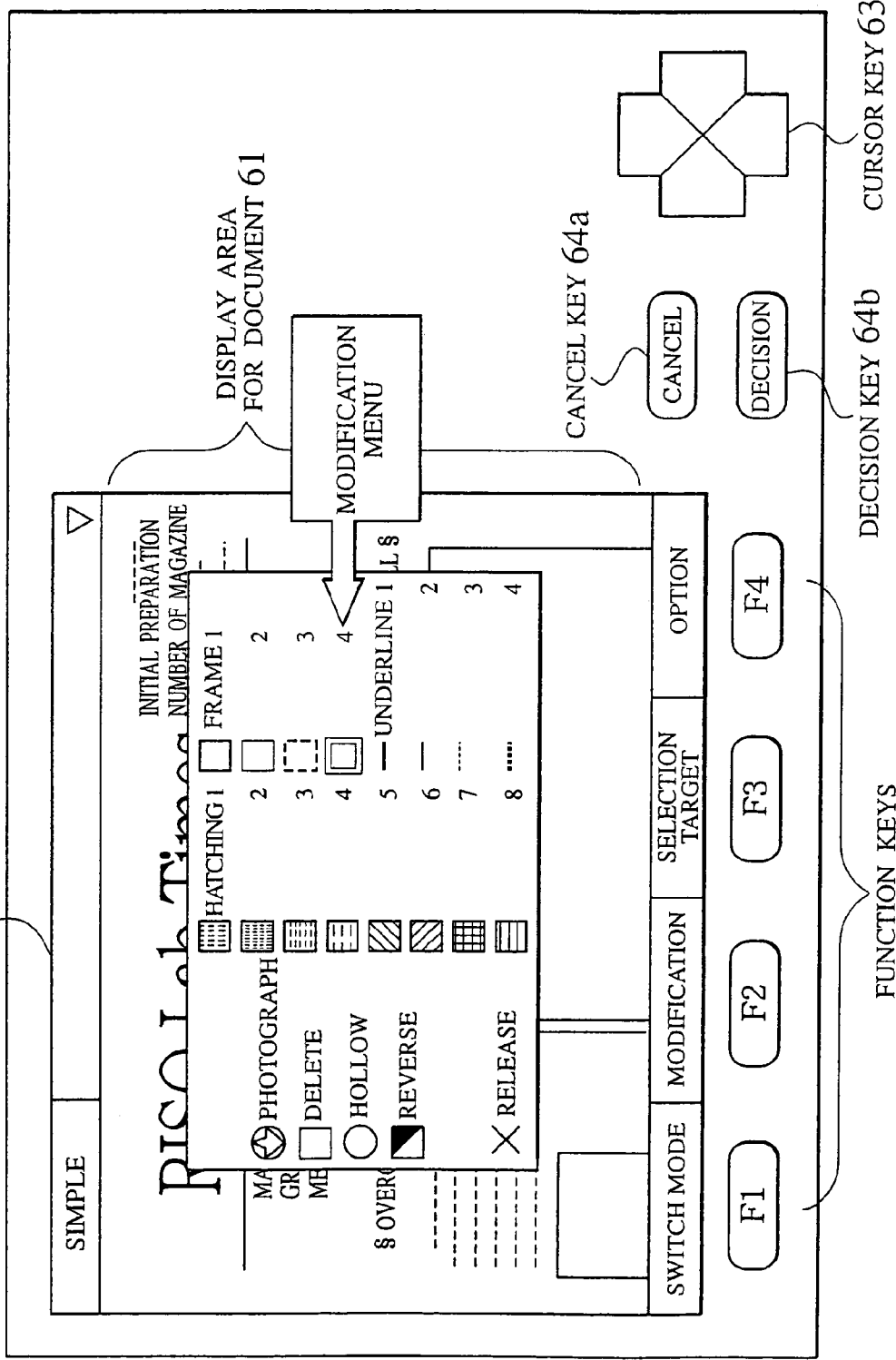
FIG. 20 is a diagram showing another display example on the display means.

(2) When the operator pushes the decision key 64b again or pushes the function key F2 (Modification) while keeping the cursor on the target rectangle region, as shown in FIG. 20, the display is switched to the modification menu. The operator moves the cursor key 61 in the modification menu in order to select one of the contents (kinds) of the modification, and pushes the decision key 64b in order to specify the desired content of the modification at Step S24.

Figure 21:
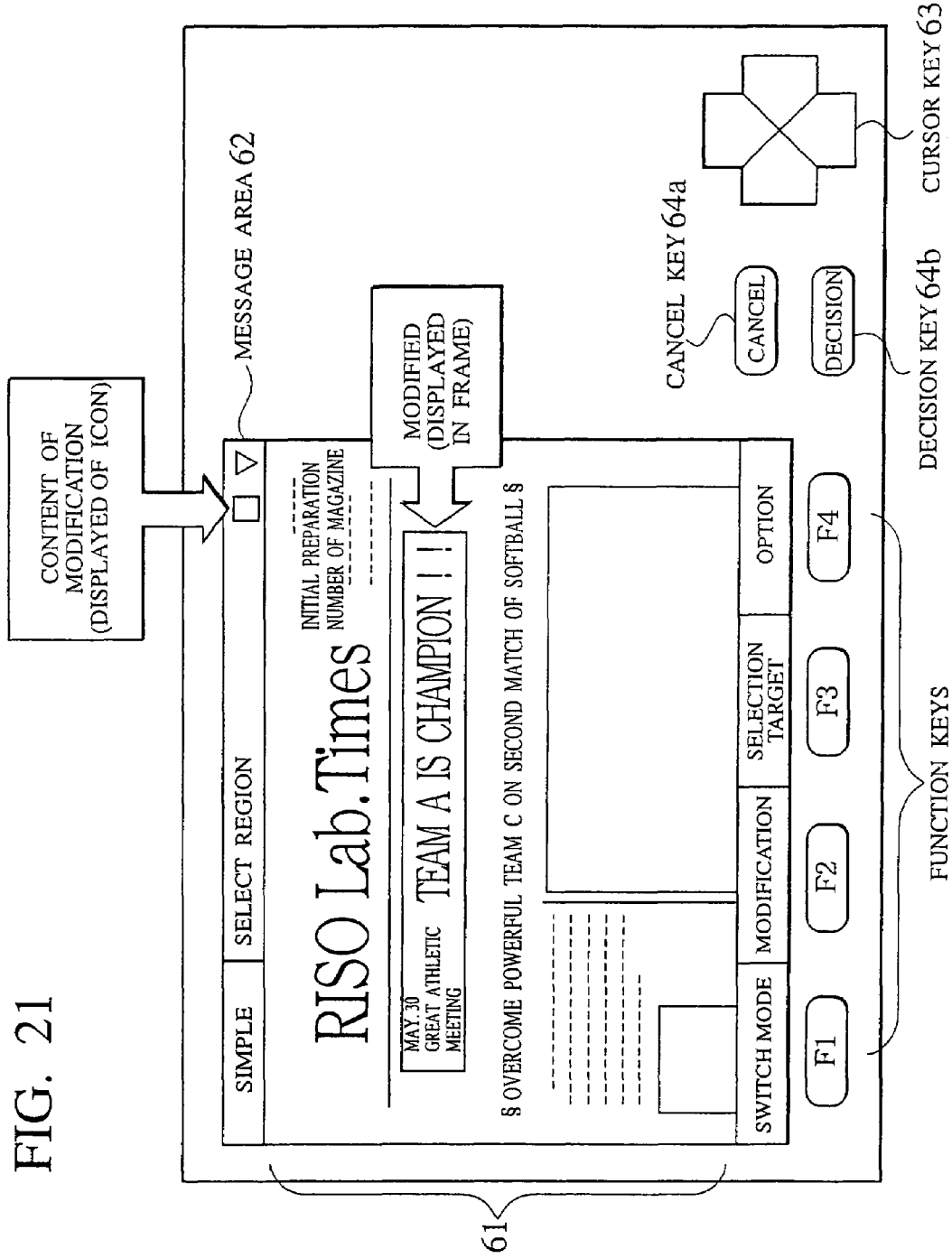
FIG. 21 is a diagram showing another display example on the display means.

At Step S24, when the content of the modification to the target rectangle region to be modified is determined, the position information of this target rectangle region is obtained by the modification region selection means 51, and the content of the modification is also selected by the modification content selection means 53. These information and the content are stored into the modification information storage means 3. At the same time, as shown in FIG. 21, the reduced image of the original image data and an icon specifying the content of the modification for the selected target region are displayed on the display panel of the display means 4.

In the present embodiment, there are contents of the modification such as "hatching", "delete", "photograph", "reverse", "frame", "underline", "hollow", and "extract" (delete regions other than the selected region). These contents can be selected. The operation of the modification is repeated until the completion of the modification is judged at Step S25.

(3) After the completion of the designation for the modification, the operator specifies to start the main scan at Step S26.

When the operator specifies to start the main scan, the modification image making means 6 inputs the original image data of a desired resolution (for example, 400 dpi) from the image input means 1, and reads the content of the modification, per pixel of the input original image data, from the modification information storage means 3. Further, the modification image making means 6 selects the desired image processing (such as simple binary processing, photograph processing, and reverse processing, and so on) to be processed by the automatic region extracting means 2 according to the content of the modification that has been read. For example, when the content of the modification is the photograph processing, the desired processing becomes the photograph processing, when the reverse processing, the desired processing becomes the reverse processing.

Furthermore, when the content of the modification designates the framing or the underline, the mask pattern corresponding to its content is made. The image output means 7 prints the obtained image on a print paper and then outputs the print paper.

As described above, according to the present embodiment, the operator can select the target rectangle region for the modification, to be corresponded to the contents of the modifications that have been stored in advance, as the rectangle region corresponding to one of the attributes, "character", "photograph", "table", "ruled lien", and "frame". That is, the document as the target to be modified can include the documents in which various attributes such as "character", "photograph", "table", "ruled line", and "frame" are mixed. It is thereby possible to perform easily and efficiently the modification for the image without any increasing the workload for the operator. In addition, it is also possible to increase the general versatility of the document modification apparatus and the image processing apparatus equipped with this document modification apparatus.

Second Embodiment

Figure 23:
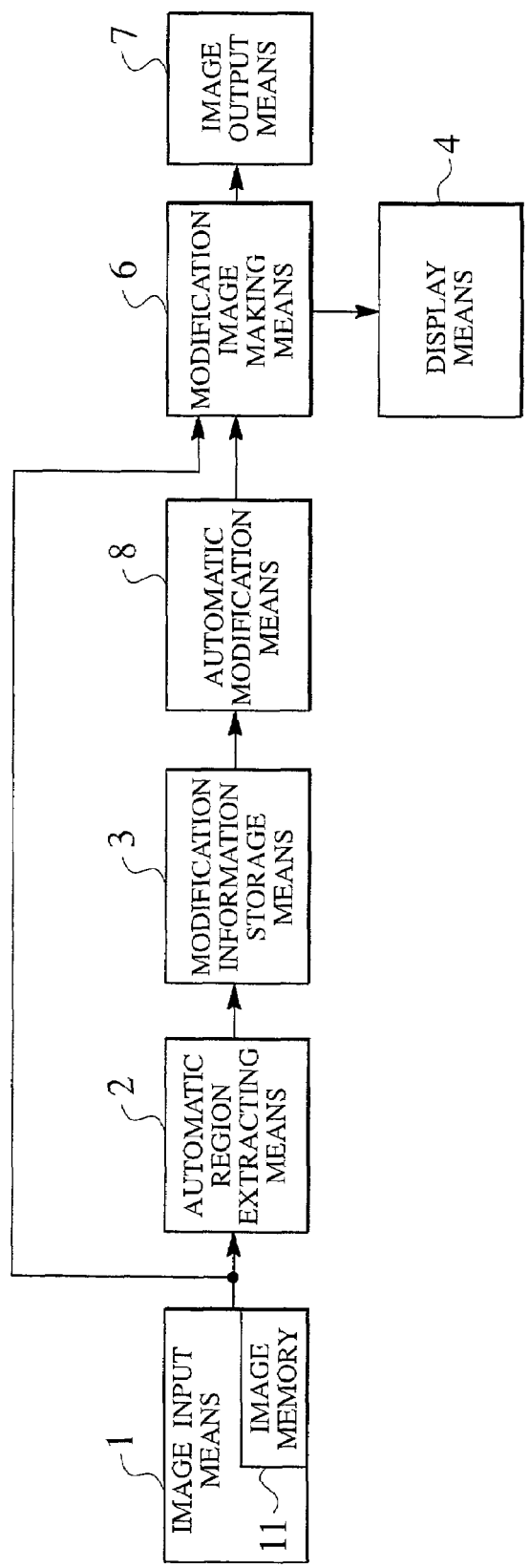
FIG. 23 is a block diagram showing an image processing apparatus equipped with a document modification apparatus according to a second embodiment of the present invention.

FIG. 23 is a block diagram showing the image processing apparatus equipped with the document modification apparatus according to the second embodiment of the present invention.

The image processing apparatus comprises: an image input means 1; an automatic region extracting means 2; a modification information storage means 3; a display means 4; a modification image making means 6; an image output means 7; and an automatic modification means 8.

The image input means 1 reads a target document to be processed and inputting it. The automatic region extracting means 2 extracts a character, a photograph, a table, a ruled line, a frame and the like from the target document that has been read. The modification information storage means 3 stores extract information (position information and attribute information) regarding the rectangle regions that have been extracted. The automatic modification means 8 automatically modifies each rectangle region of the input image of the target document according to the extract information (position information and attribute information) from the modification information storage means 3. The modification image making means 6 makes a modified image obtained by modifying the input image of the document according to the modification determined by the automatic modification means 8. The display means 4 displays modified image. The image output means 7 prints the modified image on a print sheet and outputting the print sheet. In the second embodiment, the same reference numbers are used for the same components of the first embodiment.

Next, a description will be given of the operation of the image processing apparatus according to second embodiment.

The configuration of the image processing apparatus according to the second embodiment is basically equal to that of the first embodiment. The difference is as follows:

In the configuration of the first embodiment, an operator specifies the modification type for each rectangle region. On the other hand, in the configuration of the second embodiment, the automatic modification means 8 can modify automatically the rectangle regions that have been extracted from the input image.

Hereinafter, the difference will be explained in detail.

The input image that has been read by the image input means 1 is stored temporarily into the image memory 11 (as the image storage means) in the image input means 1. The input image stored in the image memory 11 is transferred to both the automatic region extracting means 2 and the modification image making means 6.

The automatic region extracting means 2 extracts rectangle regions corresponding to one of attributes such as "character", "photograph, "table", "ruled line", and "frame", from the input image, and then stores rectangle information of the rectangle regions that have been extracted (position information about rectangle regions that have been extracted and attribute information about those rectangle regions) into the modification information storage means 3.

The automatic modification means 8 comprises a memory (not shown), for example, which stores the table shown in FIG. 24 in which the attributes and contents of the modification corresponding to the positions of the rectangle region that have been extracted as the automatic modification information. The automatic modification means 8 determines the contents of the modification to be applied to the rectangle regions that haven been extracted from the original image. For example, the automatic modification means 8 determines to perform the contents of the modification (for example, the "header" part is reversed and the "table" section is shaded) based on the attributes and the features stored in the modification information storage means 3.

The modification image making means 6 performs the contents of the modification, for example, "reversing", "shading", and so on, determined by the automatic modification means 8 and makes the mask pattern of the input image after the modification, and then outputs the mask pattern to the display means 4 and the image output means 7. The operator can recognize the content of the modification to the modified image displayed on the display means 4. The image output means 7 prints the modified image on a printing sheet and then outputs the printing sheet.

By the way, it is possible to change the contents in the table stored in the automatic modification means 8 by the operator.

As described above, according to the second embodiment, the rectangle regions corresponding to the attributes such as "character", "photograph", "table", "frame", "ruled line", and so on are extracted from the original image, and modifies automatically the extracted rectangle regions according to the contents for the modification set in the table in advance.

Accordingly, the second embodiment can be efficiently applied to the case where the contents of the modification is fixed, for example, applied to a document such as an advertisement because it is possible to automatically perform the modification to the document without necessary of any operator's work.

By the way, although the image processing apparatus includes the display means in both the configurations of the first and second embodiments, it is possible to eliminate the display means from the configuration and also to obtain the same effect because it is not necessary to incorporate the display means.

Both the first and second embodiments have been explained by using the documents of lateral lines in lateral writing, but the present invention is not limited by these cases, it is also possible for the present invention to apply documents of vertical lines in vertical writing such as Japanese documents by switching the process of the main-scan direction with the process of the sub-scan direction.

Furthermore, although the image processing apparatus according to both the first and second embodiments use the LCD panel as the display means, it is possible to use a CRT display instead of the LCD panel. Moreover, the first embodiment uses the key input method as the specifying means 52 in the operation means 5, but the present invention is not limited by this case, for example it is possible to use a mouse, a touch panel, or another method.

In addition, the image processing apparatuses of both the first and second embodiments are capable of performing the modification to the input image per line or paragraph when the result of the judgment of the attribute specifies the attribute "character". However, the present invention is not limited by this operation, for example, it is also possible to perform the cutting process to estimate the interval of adjacent lines based on the height of a character, and to perform the modification per line.

Further, when the image input means in both the first and second embodiments is capable of inputting directly binary data during the pre-scan process, it is possible to eliminate the binarization means 21 from the configurations of the first and second embodiments, and when capable of inputting directly multi-value data, it is possible for the automatic region extracting means 2 to extract regions from multi-value data and to perform the modification for the extract regions.

As set forth in detail, according to the present invention, because rectangle regions corresponding to the various attributes such as "character", "photograph", "table", "ruled line", and "frame" can be extracted from input image, it is possible to apply the present invention to target documents which involve mixed attributes such as characters, photographs, tables, ruled lines, and frames and also possible to increasing the general versatility of the image processing apparatus.

Furthermore, according to the present invention, because the instruction of the modification can be performed per line, it is possible to reduce the operator's load and thereby possible to reduce the working time of the modification for target document image.

Moreover, according to the present invention, because the rectangle regions that have been extracted from the input image can be displayed in addition to the input image, it is possible to easily and efficiently select the target rectangle regions to be modified.

Furthermore, according to the present invention, because the rectangle regions that have been extracted are blinking on the display means, it is possible for the operator to smoothly select the target rectangle regions to be modified without any missing the target rectangle regions.

In addition, according to the present invention, it is possible to easily specify a modification displayed in the menu, to be applied to the selected rectangle region.

Furthermore, according to the present invention, the input image is reduced in size, so that the it is possible to display the input image or the rectangle regions that haven been extracted according to the display size of the LCD panel in the display means, and it is thereby possible to increase the ease of the operation in the selection of the target rectangle region and the modification.

Moreover, according to the present invention, because the rectangle regions of the input image to be modified are selected automatically and the kinds of the modification are also determined automatically, it is possible to perform the modification to the image of each target rectangle region to be modified without receiving any instruction form the operator.

Furthermore, according to the present invention, because the documents including various kinds of the attributes such as "character", "photograph", "table", ruled line", "frame", and so on can be modified easily, it is thereby possible to modify the image of the document efficiently and also to increase the general versatility of the image processing apparatus equipped with document modification apparatus.

While the above provides a full and complete disclosure of the preferred embodiments of the present invention, various modifications, alternate constructions and equivalents may be employed without departing from the scope of the invention. Therefore the above description and illustration should not be construed as limiting the scope of the invention, which is defined by the appended claims.

What is claimed is:

1. A document modification apparatus for modifying image data read by image input means, comprising:
   region extracting means for extracting a plurality of regions from the image data, each region being a unit to be modified;
   region selection means for selecting target regions to be modified from the plurality of regions through an operator;
   modification specifying means for specifying kinds of the modifications for the target regions selected by the region selection means through the operator; and
   modification image making means for making a modified image, based on the kinds of the modifications, in the regions in the image data selected by the region selection means, specified by the modification specifying means;
   wherein the region extracting means extracts rectangle regions as the target regions to be modified, and the region extracting means comprises a first judgment means for judging whether an attribute of the rectangle region is one of a "character" and "ruled-line," and "others," projection means for taking a projection data in vertical and horizontal directions of the rectangle region of the image data, and a second judgment means for judging whether the attribute of the rectangle region, whose attribute has been judged by the first judgment means as "others," is one of a "table," a "photograph," and a "frame" according to a number of peaks detected from the projection data,
   operation of the second judgment means being based on whether the first judgment means identifies the attribute as "others."

2. The document modification apparatus according to claim 1, wherein the region extracting means integrates the rectangle region, whose attribute has been judged as "character" by the first judgment means, per line and paragraph, and the region selection means selects the target region to be modified per line and paragraph through the operator.

3. The document modification apparatus according to claim 1, wherein the region extracting means displays on the display screen the rectangle regions extracted by the region extracting means with the image data read by the image input means, and selects whether each rectangle region on the display screen is modified or not through the operator.

4. The document modification apparatus according to claim 1, wherein the modification specifying means displays an at-a-glance menu showing information regarding kinds of the modification, and selects the modification, to be applied to the selected rectangle regions, from the kinds of the modifications shown in the at-a-glance menu through the operator.

5. The document modification apparatus according to claim 1, wherein the modification image making means comprises memory means for storing position information of the selected rectangle regions by the region selection means and the modification information regarding the kinds of the modifications specified by the modification specifying means,
   and the modification image making means performs the modification for the image data read by the image input means based on the position information and the modification stored in the memory means.

6. The document modification apparatus according to claim 1, further comprises resolution conversion means for changing a resolution of the input image data to a reduced image and display means for displaying the reduced image obtained by the resolution conversion means with the rectangle regions extracted by the region extracting means.

7. A document modification apparatus for modifying image data read by image input means, comprising:
   region extracting means for extracting a plurality of regions from the image data, each region being a unit to be modified;
   automatic modification means for automatically selecting target regions to be modified from the plurality of regions, and for automatically modifying the selected target regions based on modifications that have been set in advance; and
   modification image making means for making an image modified image in the target regions selected by the automatic modification means based on the kinds of the modifications determined by the automatic modification means;
   wherein the region extracting means extracts rectangle regions as the target regions to be modified, and the region extracting means comprise a first judgment means for judging whether an attribute of the rectangle region is one of a "character" and "ruled-line," and "others," projection means for taking a projection data in vertical and horizontal directions of the rectangle region of the image data, and a second judgment means for judging whether the attribute of the rectangle regions, whose attribute has been judged by the first judgment means as "others," is one of a "table," a "photograph," and a "frame" according to a number of peaks detected from the projection data, the operation of the second judgment means being based on whether the first judgment means identifies the attribute as "others."

8. The document modification apparatus according to claim 7, wherein the automatic modification means determines a kind of the modification to be applied to each selected target region in consideration of the attribute for the selected target region and the position of the selected target region in the input image data.

9. The document modification apparatus according to claim 1, wherein the image input means converts the input image data to binary image data.

10. The document modification apparatus according to claim 7, wherein the image input means converts the input image data to binary image data.

11. An image processing apparatus comprising:

image input means for reading image data from a document;

the document modification apparatus, as claimed in claim 1, for making modified image by modifying the input image data obtained by the image input means; and image output means for outputting the modified image obtained by the document modification apparatus.

12. An image processing apparatus comprising:

image input means for reading image data from a document;

the document modification apparatus, as claimed in claim 7, for making modified image by modifying the input image data obtained by the image input means; and image output means for outputting the modified image obtained by the document modification apparatus.

* * * * *